United States Patent
Cai et al.

(10) Patent No.: US 12,219,446 B2
(45) Date of Patent: *Feb. 4, 2025

(54) SYSTEM AND METHOD FOR IMPLEMENTING AUTOMOBILE ELECTRONIC CONTROL FUNCTION, AND AUTOMOBILE

(71) Applicant: Shenzhen Yinwang Intelligent Technologies Co., Ltd., Shenzhen (CN)

(72) Inventors: Jianyong Cai, Shenzhen (CN); Xiaohua Chen, Shanghai (CN); Yalin Liu, Shanghai (CN); Chao Pang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,640

(22) Filed: Aug. 15, 2022

(65) Prior Publication Data

US 2023/0038536 A1 Feb. 9, 2023

Related U.S. Application Data

(63) Continuation of application No. 17/230,050, filed on Apr. 14, 2021, now Pat. No. 11,418,935, which is a (Continued)

(30) Foreign Application Priority Data

Sep. 12, 2019 (CN) .......................... 201910865878.4

(51) Int. Cl.
*H04W 4/46* (2018.01)
*B60R 16/023* (2006.01)
(Continued)

(52) U.S. Cl.
CPC ............. *H04W 4/46* (2018.02); *H04W 76/15* (2018.02); *H04W 84/18* (2013.01); *B60R 16/023* (2013.01);
(Continued)

(58) Field of Classification Search
CPC .............. B60R 16/023; B60R 16/0232; B60R 16/0315; B60W 50/0098;
(Continued)

(56) References Cited

U.S. PATENT DOCUMENTS 9,088,514 B2   7/2015  Kim et al.
10,549,760 B2 * 2/2020  Rave ................ B60W 50/0205
(Continued)

FOREIGN PATENT DOCUMENTS

CN    104301434 A    1/2015
CN    107197007 A    9/2017
(Continued)

OTHER PUBLICATIONS

Chen, N., "Research on Reliability and Real-time Performance of Safety Messages in Vehicular Ad Hoc Networks," University of Electronic Science and Technology, May 2018, with an English abstract, 73 pages.

*Primary Examiner* — Kibrom T Hailu
*Assistant Examiner* — Kai Chang
(74) *Attorney, Agent, or Firm* — Conley Rose, P.C.

(57) ABSTRACT

A system, automobile, and method for implementing an electronic control function of an automobile. The system includes a first vehicle integration unit (VIU), an automobile control unit, and a plurality of automobile parts. The automobile control unit includes a first domain controller (DC) or a central computing platform (CCP). The automobile control unit is configured to send first control information to the first VIU. The first VIU is configured to control the (Continued)

plurality of automobile parts based on the first control information. In embodiments of this application, the first VIU controls the plurality of automobile parts.

20 Claims, 11 Drawing Sheets

Related U.S. Application Data continuation of application No. PCT/CN2020/099721, filed on Jul. 1, 2020.

(51) Int. Cl.
| | |
|---|---|
| H04B 10/275 | (2013.01) |
| H04L 12/40 | (2006.01) |
| H04L 67/12 | (2022.01) |
| H04L 69/08 | (2022.01) |
| H04W 76/15 | (2018.01) |
| H04W 84/18 | (2009.01) |

(52) U.S. Cl.
CPC .. *H04B 10/275* (2013.01); *H04L 2012/40273* (2013.01); *H04L 67/12* (2013.01); *H04L 69/08* (2013.01)

(58) Field of Classification Search
CPC ......... B60W 2050/0002; G05B 19/418; G08C 13/00; H04B 10/275; H04L 12/403; H04L 12/423; H04L 41/02; H04L 67/12; H04L 67/565; H04L 69/08; H04L 2012/40215; H04L 2012/40273; H04L 12/4633; H04W 4/46; H04W 76/15; H04W 84/18; Y02P 90/02; B06W 50/0098; B06W 2050/002
See application file for complete search history.

(56) References Cited

U.S. PATENT DOCUMENTS

| | | | |
|---|---|---|---|
| 10,778,608 B2* | 9/2020 | Yousefi | H04L 47/76 |
| 10,827,355 B2* | 11/2020 | Lekkas | H04W 4/44 |
| 2003/0144784 A1 | 7/2003 | Tashiro et al. | |
| 2003/0144794 A1 | 7/2003 | Schuessler | |
| 2004/0083043 A1 | 4/2004 | Akiyama et al. | |
| 2005/0049722 A1 | 3/2005 | Kobayashi | |
| 2007/0067085 A1 | 3/2007 | Lu et al. | |
| 2008/0259946 A1 | 10/2008 | Goto et al. | |
| 2012/0182935 A1 | 7/2012 | Addepalli et al. | |
| 2014/0126584 A1 | 5/2014 | Hwang et al. | |
| 2014/0215491 A1* | 7/2014 | Addepalli | B60R 16/023 719/313 |
| 2015/0117463 A1 | 4/2015 | Nelson | |
| 2016/0302253 A1 | 10/2016 | Jiang et al. | |
| 2017/0150361 A1* | 5/2017 | Paryani | H04W 12/08 |
| 2018/0076970 A1 | 3/2018 | Han et al. | |
| 2018/0113830 A1 | 4/2018 | Sherriff et al. | |
| 2018/0212822 A1* | 7/2018 | Ikeda | H04L 41/082 |
| 2018/0278616 A1* | 9/2018 | Sakamoto | G06F 21/85 |
| 2018/0281598 A1* | 10/2018 | Shu | G05B 19/042 |
| 2019/0050522 A1 | 2/2019 | Alvarez et al. | |
| 2019/0058611 A1 | 2/2019 | Maeda et al. | |
| 2019/0068407 A1 | 2/2019 | Haga et al. | |
| 2019/0081816 A1* | 3/2019 | Lee | B60R 16/0315 |
| 2019/0095371 A1* | 3/2019 | Yoshino | B60R 16/0238 |
| 2019/0123937 A1 | 4/2019 | Takamatsu et al. | |
| 2019/0126858 A1* | 5/2019 | Parmar | H04L 65/104 |
| 2019/0281052 A1* | 9/2019 | Lekkas | H04L 9/14 |
| 2019/0340116 A1* | 11/2019 | Miyauchi | G06F 11/203 |
| 2019/0384522 A1* | 12/2019 | Yun | G06F 3/0635 |
| 2020/0045057 A1* | 2/2020 | Schmidt | H04L 63/0428 |
| 2020/0092129 A1 | 3/2020 | Lin et al. | |
| 2020/0145252 A1 | 5/2020 | Torisaki et al. | |
| 2020/0169555 A1* | 5/2020 | Chung | H04L 63/0876 |
| 2020/0412694 A1* | 12/2020 | Vanderveen | H04L 63/0263 |
| 2021/0004221 A1* | 1/2021 | Lin | G06F 8/65 |
| 2021/0021618 A1* | 1/2021 | Tanaka | H04L 63/0236 |
| 2021/0029061 A1* | 1/2021 | Mizukoshi | H04L 49/254 |
| 2021/0034744 A1 | 2/2021 | Inque | |
| 2021/0061194 A1* | 3/2021 | Sugawa | H04L 12/66 |
| 2021/0067930 A1 | 3/2021 | Yokota et al. | |
| 2021/0155173 A1* | 5/2021 | Harata | H04L 12/40019 |

FOREIGN PATENT DOCUMENTS

| | | |
|---|---|---|
| CN | 206932240 U | 1/2018 |
| CN | 207028904 U | 2/2018 |
| CN | 107976970 A | 5/2018 |
| CN | 108177612 A | 6/2018 |
| CN | 108737575 A | 11/2018 |
| CN | 108891409 A | 11/2018 |
| CN | 109116777 A | 1/2019 |
| CN | 109116844 A | 1/2019 |
| CN | 109541987 A | 3/2019 |
| CN | 109917765 A | 6/2019 |
| CN | 209030252 U | 6/2019 |
| CN | 109995628 A | 7/2019 |
| CN | 210578605 U | 5/2020 |
| EP | 3535625 B1 | 2/2021 |
| JP | 2004038766 A | 2/2004 |
| JP | 2004136816 A | 5/2004 |
| JP | 2004302944 A | 10/2004 |
| JP | 2005075024 A | 3/2005 |
| JP | 2006051922 A | 2/2006 |
| JP | 2008210050 A | 9/2008 |
| JP | 2017178307 A | 10/2017 |
| JP | 2018020609 A | 2/2018 |
| JP | 2019146089 A | 8/2019 |
| KR | 101470206 B1 | 12/2014 |
| KR | 20160046317 A | 4/2016 |
| KR | 20160116451 A | 10/2016 |
| KR | 20180029846 A | 3/2018 |

\* cited by examiner

SYSTEM AND METHOD FOR IMPLEMENTING AUTOMOBILE ELECTRONIC CONTROL FUNCTION, AND AUTOMOBILE

CROSS-REFERENCE TO RELATED APPLICATIONS

This is a continuation of U.S. patent application Ser. No. 17/230,050 filed on Apr. 14, 2021, now U.S. Pat. No. 11,418,935, which is a continuation of International Patent Application No. PCT/CN2020/099721 filed on Jul. 1, 2020, which claims priority to Chinese Patent Application No. 201910865878.4 filed on Sep. 12, 2019. All of the aforementioned applications are hereby incorporated by reference in their entireties.

TECHNICAL FIELD

This application relates to the automobile field, and more specifically, to a system and a method for implementing an automobile electronic control function, and an automobile.

BACKGROUND

Nowadays, intelligentization, networking, electrification, and sharing have become development trends in the automobile field. The development trends are usually implemented based on a system for implementing an automobile electronic control function. Currently, the system for implementing the automobile electronic control function mainly includes a plurality of types of electronic control elements: a central computing platform (CCP), a domain control unit (e.g., domain controller (DC)), and an electronic control unit (ECU).

The CCP is configured to provide a data processing function for data of an entire automobile. The DC is configured to control a plurality of automobile parts in functional domains, and may be usually classified into a power assembly domain controller, an automobile security domain controller, an automobile body domain controller, an intelligent cockpit domain controller, an intelligent driving domain controller, and the like based on functions of the automobile parts. The ECU is located in an automobile part and has the electronic control function. For example, the ECU may control the automobile part according to a control instruction. For another example, the ECU may process to-be-transmitted data in the automobile part.

To adapt to the development trends in the automobile field, more automobile functions need to be implemented, and there are more electronic control elements, especially ECUs located in the automobile part, in the system for implementing the automobile electronic control functions. Usually, one or more ECUs are disposed in each automobile part having an electronic control function in the automobile, and each ECU needs to have a control function, a computing function, and the like. This causes high costs of the ECUs, and high costs of the automobile parts carrying the ECUs.

SUMMARY

This application provides a system and method for implementing an automobile electronic control function, and an automobile, to reduce costs of automobile parts in the automobile.

According to a first aspect, this application provides a system for implementing an automobile electronic control function. The system includes a plurality of automobile parts, a first vehicle integration unit (VIU), and a first DC. The first DC is in communication connection with the first VIU. The first VIU is in communication connection with the plurality of automobile parts. The first VIU is configured to receive first control information sent by the first DC. The first VIU is configured to control the plurality of automobile parts based on the first control information.

In this embodiment of this application, the first VIU controls the plurality of automobile parts. To be more specific, the first VIU replaces ECUs in the plurality of automobile parts to implement a control function. Therefore, ECUs in all automobile parts do not need to control the automobile parts separately in a conventional system for implementing an automobile electronic control function, to simplify functions of the ECUs in the automobile parts. This helps reduce costs of the ECUs in the automobile parts, and thus reduce costs of the automobile parts.

In addition, in the system for implementing the automobile electronic control function as provided in this application, the plurality of automobile parts may be connected to one first VIU, and connected to the DC using the first VIU. As such, the disclosed system may avoid a case in which each automobile part in the conventional system for implementing the automobile electronic control function needs to be connected to the DC using a respective wiring harness. This helps reduce a length of the wiring harness in the system for implementing the automobile electronic control function.

Optionally, the system may further include a CCP. The CCP is in communication connection with the first DC.

In a possible implementation, the first VIU is further configured to: obtain first data from the plurality of automobile parts; and send the first data to the first DC.

In this embodiment of this application, the first VIU forwards the first data from the plurality of automobile parts. To be more specific, the first VIU replaces ECUs in the plurality of automobile parts, to implement a data forwarding function. Therefore, the ECUs in all the automobile parts do not need to implement the data forwarding function separately in the conventional system for implementing the automobile electronic control function, to simplify the functions of the ECUs in the automobile parts. This helps reduce the costs of the ECUs in the automobile parts, and thus reduce the costs of the automobile parts.

In a possible implementation, the first VIU is further configured to: obtain second data from the plurality of automobile parts; and process the second data to obtain the first data. The processing includes one or more of the following operations: processing the second data, encapsulating the second data according to a transport protocol, converting a protocol of the second data, or converting a data format of the second data.

In this embodiment of this application, the first VIU processes the second data from the plurality of automobile parts to obtain the first data. To be more specific, the first VIU replaces the ECUs in the plurality of automobile parts, to implement the processing function. This helps reduce the costs of the ECUs in the automobile parts.

In a possible implementation, the first VIU is configured to implement some or all electronic control functions of the plurality of automobile parts. In other words, the first VIU is configured to implement some or all functions of the ECUs located in the plurality of automobile parts.

In this embodiment of this application, the first VIU implements some or all functions of the ECUs located in the plurality of automobile parts. The functions of the ECUs in the automobile part are simplified. This helps reduce the costs of the ECUs in the automobile parts, and finally reduce the costs of the automobile parts.

Optionally, the ECUs in the plurality of automobile parts no longer perform some or all of the functions.

In this embodiment of this application, the first VIU implements some or all functions of the ECUs located in the plurality of automobile parts. Correspondingly, the automobile parts do not need to have all functions of the ECUs. This helps reduce the costs of the automobile parts.

Optionally, the ECUs are not disposed in the plurality of automobile parts.

In this embodiment of this application, the first VIU implements some or all functions of the ECUs located in the plurality of automobile parts. Correspondingly, the automobile parts do not need to have the ECUs. This helps reduce the costs of the automobile parts.

In a possible implementation, the automobile includes a plurality of VIUs. The plurality of VIUs include the first VIU, and the plurality of VIUs form a ring communications network.

In this embodiment of this application, the plurality of VIUs form the ring communications network, such that the plurality of VIUs can communicate with each other. This helps improve flexibility and reliability of information (including data or control information) transmission in the system for implementing the automobile electronic control function.

In a possible implementation, the ring communications network is an Ethernet-based ring communications network. This helps improve an information transmission speed in the system for implementing the automobile electronic control function.

In a possible implementation, the automobile includes a plurality of VIUs, the plurality of VIUs include the first VIU, and any two different VIUs in the plurality of VIUs have a communication connection.

In this embodiment of this application, any two different VIUs in the plurality of VIUs have the communication connection, such that the plurality of VIUs can communicate with each other. This helps improve the flexibility and reliability of information (including the data or the control information) transmission in the system for implementing the automobile electronic control function.

Optionally, a quantity of the plurality of VIUs is any one of the following: 3, 4, 2, or 5.

In a possible implementation, the plurality of automobile parts are a first automobile part set. The automobile further includes a second automobile part set. The plurality of VIUs further include a second VIU. The first VIU is configured to control the first automobile part set. The second VIU is configured to control the second automobile part set. The first VIU is further configured to: receive control information of the second automobile part set if the second VIU fails; and control an automobile part in the second automobile part set based on the control information of the second automobile part set.

It should be noted that the control information of the second automobile part set is different from the first control information. A control object of the first control information is the plurality of automobile parts in the first automobile part set. The control information of the second automobile part set is an automobile part in the second automobile part set.

In this embodiment of this application, after the second VIU fails, the first VIU may take over the second VIU to control the plurality of automobile parts. This helps improve reliability of the control function in the system.

In a possible implementation, the plurality of automobile parts are the first automobile part set. The automobile further includes a third automobile part set. The plurality of VIUs further include a third VIU. The first VIU is configured to provide a data processing function for the first automobile part set. The third VIU is configured to provide a data processing function for the third automobile part set. The first VIU is further configured to: obtain data of the third automobile part set if the third VIU fails; and send the data of the third automobile part set.

In this embodiment of this application, after the third VIU fails, the first VIU may take over the third VIU to forward data of the third automobile part set. This helps improve reliability of data transmission in the system.

In a possible implementation, the automobile further includes a second DC. The first VIU is configured to receive second control information sent by the second DC. The second control information is used to control some or all of the plurality of automobile parts.

In this embodiment of this application, the first VIU may further receive the control information from the second DC, to control some or all of the plurality of automobile parts. This helps improve control flexibility of the system.

Optionally, the first DC is an intelligent driving domain controller of the automobile. The second DC includes a chassis domain controller of the automobile.

In this embodiment of this application, both the intelligent driving domain controller and the chassis domain controller may control the plurality of automobile parts using the first VIU. This helps improve the control flexibility of the system.

According to a second aspect, this application provides a system for implementing an automobile electronic control function. The system includes a plurality of automobile parts, a CCP, and a first VIU. The CCP is in communication connection with the first VIU. The first VIU is in communication connection with the plurality of automobile parts. The first VIU is configured to receive first control information sent by the CCP. The first VIU is configured to control the plurality of automobile parts based on the first control information.

In this embodiment of this application, the first VIU controls the plurality of automobile parts. To be more specific, the first VIU replaces ECUs in the plurality of automobile parts to implement a control function. Therefore, ECUs in all automobile parts do not need to control the automobile parts separately in a conventional system for implementing an automobile electronic control function, to simplify functions of the ECUs in the automobile parts. This helps reduce costs of the ECUs in the automobile parts, and finally reduce costs of the automobile parts.

In addition, in the system for implementing the automobile electronic control function as provided in this application, the plurality of automobile parts may be connected to one first VIU, and are connected to the CCP using the first VIU, to avoid a case in which each automobile part in the conventional system for implementing the automobile electronic control function needs to be connected to the CCP using a respective wiring harness. This helps reduce a length of the wiring harness in the system for implementing the automobile electronic control function.

In a possible implementation, the first VIU is further configured to: obtain first data from the plurality of automobile parts; and send the first data to the CCP.

In this embodiment of this application, the first VIU forwards the first data from the plurality of automobile parts. To be more specific, the first VIU replaces ECUs in the plurality of automobile parts, to implement a data forwarding function. Therefore, the ECUs in all the automobile parts do not need to implement the data forwarding function separately in the conventional system for implementing the automobile electronic control function, to simplify the functions of the ECUs in the automobile parts. This helps reduce the costs of the ECUs in the automobile parts, and finally reduce the costs of the automobile parts.

In a possible implementation, the first VIU is further configured to: obtain second data from the plurality of automobile parts; and process the second data to obtain the first data. The processing includes one or more of the following operations: processing the second data, encapsulating the second data according to a transport protocol, converting a protocol of the second data, or converting a data format of the second data.

In this embodiment of this application, the first VIU processes the second data from the plurality of automobile parts to obtain the first data. To be more specific, the first VIU replaces the ECUs in the plurality of automobile parts, to implement the processing function. This helps reduce the costs of the ECUs in the automobile parts.

In a possible implementation, the first VIU is configured to implement some or all electronic control functions of the plurality of automobile parts. In other words, the first VIU is configured to implement some or all functions of the ECUs located in the plurality of automobile parts.

In this embodiment of this application, the first VIU implements some or all functions of the ECUs located in the plurality of automobile parts. The functions of the ECUs in the automobile part are simplified. This helps reduce the costs of the ECUs in the automobile parts, and finally reduce the costs of the automobile parts.

Optionally, the ECUs in the plurality of automobile parts no longer perform some or all of the functions.

In this embodiment of this application, the first VIU implements some or all functions of the ECUs located in the plurality of automobile parts. Correspondingly, the automobile parts do not need to have all functions of the ECUs. This helps reduce the costs of the automobile parts.

Optionally, the ECUs are not disposed in the plurality of automobile parts.

In this embodiment of this application, the first VIU implements some or all functions of the ECUs located in the plurality of automobile parts. Correspondingly, the automobile parts do not need to have the ECUs. This helps reduce the costs of the automobile parts.

In a possible implementation, the automobile includes a plurality of VIUs. The plurality of VIUs include the first VIU, and the plurality of VIUs form a ring communications network.

In this embodiment of this application, the plurality of VIUs form the ring communications network, such that the plurality of VIUs can communicate with each other. This helps improve flexibility and reliability of information (including data or control information) transmission in the system for implementing the automobile electronic control function.

In a possible implementation, the ring communications network is an Ethernet-based ring communications network. This helps improve an information transmission speed in the system for implementing the automobile electronic control function.

In a possible implementation, the automobile includes a plurality of VIUs, the plurality of VIUs include the first VIU, and any two different VIUs in the plurality of VIUs have a communication connection.

In this embodiment of this application, any two different VIUs in the plurality of VIUs have the communication connection, such that the plurality of VIUs can communicate with each other. This helps improve the flexibility and reliability of information (including the data or the control information) transmission in the system for implementing the automobile electronic control function.

Optionally, a quantity of the plurality of VIUs is any one of the following: 3, 4, 2, or 5.

In a possible implementation, the plurality of automobile parts are a first automobile part set. The automobile further includes a second automobile part set. The plurality of VIUs further include a second VIU. The first VIU is configured to control the first automobile part set. The second VIU is configured to control the second automobile part set. The first VIU is further configured to: receive control information of the second automobile part set if the second VIU fails; and control an automobile part in the second automobile part set based on the control information of the second automobile part set.

In this embodiment of this application, after the second VIU fails, the first VIU may take over the second VIU to control the plurality of automobile parts. This helps improve reliability of the control function in the system.

In a possible implementation, the plurality of automobile parts are the first automobile part set. The automobile further includes a third automobile part set. The plurality of VIUs further include a third VIU. The first VIU is configured to provide a data processing function for the first automobile part set. The third VIU is configured to provide a data processing function for the third automobile part set. The first VIU is further configured to: obtain data of the third automobile part set if the third VIU fails; and send the data of the third automobile part set.

In this embodiment of this application, after the third VIU fails, the first VIU may take over the third VIU to forward data of the third automobile part set. This helps improve reliability of data transmission in the system.

In a possible implementation, the automobile further includes a second DC. The first VIU is configured to receive second control information sent by the second DC. The second control information is used to control some or all of the plurality of automobile parts.

In this embodiment of this application, the first VIU may further receive the control information from the second DC, to control some or all of the plurality of automobile parts. This helps improve control flexibility of the system.

Optionally, the first DC is an intelligent driving domain controller of the automobile. The second DC includes a chassis domain controller of the automobile.

According to a third aspect, this application provides a system for implementing an automobile electronic control function. The system includes a plurality of automobile parts, a CCP, a first DC, and a first VIU. The CCP is in communication connection with the first DC. The first DC is in communication connection with the first VIU. The first VIU is in communication connection with the plurality of automobile parts. The first VIU is configured to obtain first data from the plurality of automobile parts. The first VIU is configured to send the first data to the first DC.

In this embodiment of this application, the first VIU forwards the first data from the plurality of automobile parts. To be more specific, the first VIU replaces ECUs in the plurality of automobile parts, to implement a data forwarding function. Therefore, ECUs in all automobile parts do not need to implement the data forwarding function separately in a conventional system for implementing an automobile electronic control function. Functions of the ECUs in the automobile part are simplified. This helps reduce costs of the ECUs in the automobile parts, and finally reduce costs of the automobile parts.

In addition, in the system that is for implementing the automobile electronic control function and that is provided in this application, the plurality of automobile parts may be connected to one first VIU, and are connected to the DC using the first VIU, to avoid a case in which each automobile part in the conventional system for implementing the automobile electronic control function needs to be connected to the DC using a respective wiring harness. This helps reduce a length of the wiring harness in the system for implementing the automobile electronic control function.

In a possible implementation, the first VIU is further configured to: obtain second data from the plurality of automobile parts; and process the second data to obtain the first data. The processing includes one or more of the following operations: processing the second data, converting a protocol of the second data, encapsulating the second data according to a transport protocol, or converting a data format of the second data.

In this embodiment of this application, the first VIU processes the second data from the plurality of automobile parts to obtain the first data. To be more specific, the first VIU replaces the ECUs in the plurality of automobile parts, to implement the processing function. This helps reduce the costs of the ECUs in the automobile parts.

In a possible implementation, the first VIU is configured to implement some or all electronic control functions of the plurality of automobile parts. In other words, the first VIU is configured to implement some or all functions of the ECUs located in the plurality of automobile parts.

In this embodiment of this application, the first VIU implements some or all functions of the ECUs located in the plurality of automobile parts. The functions of the ECUs in the automobile part are simplified. This helps reduce the costs of the ECUs in the automobile parts, and finally reduce the costs of the automobile parts.

Optionally, the ECUs in the plurality of automobile parts no longer perform some or all of the functions.

In this embodiment of this application, the first VIU implements some or all functions of the ECUs located in the plurality of automobile parts. Correspondingly, the automobile parts do not need to have all functions of the ECUs. This helps reduce the costs of the automobile parts.

Optionally, the ECUs are not disposed in the plurality of automobile parts.

In this embodiment of this application, the first VIU implements some or all functions of the ECUs located in the plurality of automobile parts. Correspondingly, the automobile parts do not need to have the ECUs. This helps reduce the costs of the automobile parts.

In a possible implementation, the first VIU is further configured to collect the first data from a sensible element and/or an execution element of the plurality of automobile parts.

In this embodiment of this application, the first VIU may directly collect the first data from the sensible element and/or the execution element of the plurality of automobile parts. To be more specific, a data collection function of the ECU in the plurality of automobile parts is replaced. This helps reduce the costs of the automobile parts.

In a possible implementation, the automobile includes a plurality of VIUs. The plurality of VIUs include the first VIU, and the plurality of VIUs form a ring communications network.

In this embodiment of this application, the plurality of VIUs form the ring communications network, such that the plurality of VIUs can communicate with each other. This helps improve flexibility and reliability of information (including data or control information) transmission in the system for implementing the automobile electronic control function.

In a possible implementation, the ring communications network is an Ethernet-based ring communications network. This helps improve an information transmission speed in the system for implementing the automobile electronic control function.

In a possible implementation, the automobile includes a plurality of VIUs, the plurality of VIUs include the first VIU, and any two different VIUs in the plurality of VIUs have a communication connection.

In this embodiment of this application, any two different VIUs in the plurality of VIUs have the communication connection, such that the plurality of VIUs can communicate with each other. This helps improve the flexibility and the reliability of information (including the data or the control information) transmission in the system for implementing the automobile electronic control function.

In a possible implementation, the plurality of automobile parts are a first automobile part set. The system further includes a second automobile part set. The plurality of VIUs further include a second VIU. The first VIU is configured to provide a data processing function for the first automobile part set. The second VIU is configured to provide a data processing function for the second automobile part set. The first VIU is further configured to: obtain data in the second automobile part set if the second VIU fails; and send the data in the second automobile part set.

In this embodiment of this application, after the second VIU fails, the first VIU may take over the second VIU to forward the data of the second automobile part set. This helps improve reliability of data transmission in the system.

In a possible implementation, the system for implementing the automobile electronic control function further includes a second DC. The first VIU is further configured to send the first data to the second DC.

In this embodiment of this application, the first VIU may further send the first data to the second DC. This helps improve flexibility of data transmission in the system.

According to a fourth aspect, this application provides a system for implementing an automobile electronic control function. The automobile includes a plurality of automobile parts. An architecture of the automobile electronic control function includes a CCP and a first VIU. The CCP is in communication connection with the first VIU. The first VIU is in communication connection with the plurality of automobile parts. The first VIU is configured to obtain first data from the plurality of automobile parts. The first VIU is configured to send the first data to the CCP.

In this embodiment of this application, the first VIU forwards the first data from the plurality of automobile parts. To be more specific, the first VIU replaces ECUs in the plurality of automobile parts, to implement a data forwarding function. Therefore, ECUs in all automobile parts do not need to implement the data forwarding function separately in a conventional system for implementing an automobile electronic control function, to simplify functions of the ECUs in the automobile parts. This helps reduce costs of the ECUs in the automobile parts, and finally reduce costs of the automobile parts.

In addition, in the system for implementing the automobile electronic control function as provided in this application, the plurality of automobile parts may be connected to one first VIU, and are connected to the CCP using the first VIU, to avoid a case in which each automobile part in the conventional system for implementing the automobile electronic control function needs to be connected to the CCP using a respective wiring harness. This helps reduce a length of the wiring harness in the system for implementing the automobile electronic control function.

In a possible implementation, the first VIU is further configured to: obtain second data from the plurality of automobile parts; and process the second data to obtain the first data. The processing includes one or more of the following operations: processing the second data, converting a protocol of the second data, encapsulating the second data according to a transport protocol, or converting a data format of the second data.

In this embodiment of this application, the first VIU processes the second data from the plurality of automobile parts to obtain the first data. To be more specific, the first VIU replaces the ECUs in the plurality of automobile parts, to implement the processing function. This helps reduce the costs of the ECUs in the automobile parts.

In a possible implementation, the first VIU is configured to implement some or all electronic control functions of the plurality of automobile parts. In other words, the first VIU is configured to implement some or all functions of the ECUs located in the plurality of automobile parts.

In this embodiment of this application, the first VIU implements some or all functions of the ECUs located in the plurality of automobile parts. The functions of the ECUs in the automobile part are simplified. This helps reduce the costs of the ECUs in the automobile parts, and finally reduce the costs of the automobile parts.

Optionally, the ECUs in the plurality of automobile parts no longer perform some or all of the functions.

In this embodiment of this application, the first VIU implements some or all functions of the ECUs located in the plurality of automobile parts. Correspondingly, the automobile parts do not need to have all functions of the ECUs. This helps reduce the costs of the automobile parts.

Optionally, the ECUs are not disposed in the plurality of automobile parts.

In this embodiment of this application, the first VIU implements some or all functions of the ECUs located in the plurality of automobile parts. Correspondingly, the automobile parts do not need to have the ECUs. This helps reduce the costs of the automobile parts.

In a possible implementation, the first VIU is configured to collect the first data from a sensible element and/or an execution element of the plurality of automobile parts.

In this embodiment of this application, the first VIU may directly collect the first data from the sensible element and/or the execution element of the plurality of automobile parts. To be more specific, a data collection function of the ECU in the plurality of automobile parts is replaced. This helps reduce the costs of the automobile parts.

In a possible implementation, the automobile includes a plurality of VIUs. The plurality of VIUs include the first VIU, and the plurality of VIUs form a ring communications network.

In this embodiment of this application, the plurality of VIUs form the ring communications network, such that the plurality of VIUs can communicate with each other. This helps improve flexibility and reliability of information (including data or control information) transmission in the system for implementing the automobile electronic control function.

In a possible implementation, the ring communications network is an Ethernet-based ring communications network. This helps improve an information transmission speed in the system for implementing the automobile electronic control function.

In a possible implementation, the automobile includes a plurality of VIUs, the plurality of VIUs include the first VIU, and any two different VIUs in the plurality of VIUs have a communication connection.

In this embodiment of this application, any two different VIUs in the plurality of VIUs have the communication connection, such that the plurality of VIUs can communicate with each other. This helps improve the flexibility and the reliability of information (including the data or the control information) transmission in the system for implementing the automobile electronic control function.

In a possible implementation, the plurality of automobile parts are a first automobile part set. The automobile further includes a second automobile part set. The plurality of VIUs further include a second VIU. The first VIU is configured to provide a data processing function for the first automobile part set. The second VIU is configured to provide a data processing function for the second automobile part set. The first VIU is further configured to: obtain data in the second automobile part set if the second VIU fails; and send the data of the second automobile part set.

In this embodiment of this application, after the second VIU fails, the first VIU may take over the second VIU to forward the data of the second automobile part set. This helps improve reliability of data transmission in the system.

In a possible implementation, the system further includes a second DC. The first VIU sends the first data to the second DC.

In this embodiment of this application, the first VIU may further send the first data to the second DC. This helps improve flexibility of data transmission in the system.

According to a fifth aspect, this application provides a method for implementing an automobile electronic control function. The automobile includes a first VIU and a plurality of automobile parts. The method includes: The first VIU receives first control information sent by a first DC of the automobile or a CCP of the automobile. The first VIU controls the plurality of automobile parts based on the first control information.

In this embodiment of this application, the first VIU controls the plurality of automobile parts. To be more specific, the first VIU replaces ECUs in the plurality of automobile parts to implement a control function. Therefore, ECUs in all automobile parts do not need to control the automobile parts separately in a conventional system for implementing an automobile electronic control function, to simplify functions of the ECUs in the automobile parts. This helps reduce costs of the ECUs in the automobile parts, and finally reduce costs of the automobile parts.

In addition, in the system that is for implementing the automobile electronic control function and that is provided in this application, the plurality of automobile parts may be connected to one first VIU, and are connected to the DC or the CCP using the first VIU, to avoid a case in which each automobile part in the conventional system for implementing the automobile electronic control function needs to be connected to the DC or the CCP using a respective wiring harness. This helps reduce a length of the wiring harness in the system for implementing the automobile electronic control function.

In a possible implementation, the method further includes: The first VIU obtains first data from the plurality of automobile parts; and the first VIU sends the first data to the first DC of the automobile and/or the CCP of the automobile.

In this embodiment of this application, the first VIU forwards the first data from the plurality of automobile parts. To be more specific, the first VIU replaces the ECUs in the plurality of automobile parts, to implement a data forwarding function. Therefore, the ECUs in all the automobile parts do not need to implement the data forwarding function separately in the conventional system for implementing the automobile electronic control function, to simplify the functions of the ECUs in the automobile parts. This helps reduce the costs of the ECUs in the automobile parts, and finally reduce the costs of the automobile parts.

In a possible implementation, that the first VIU obtains first data from the plurality of automobile parts includes: The first VIU obtains second data from the plurality of automobile parts; and the first VIU processes the second data to obtain the first data. The processing includes one or more of the following operations: processing the second data, encapsulating the second data according to a transport protocol, converting a protocol of the second data, or converting a data format of the second data.

In this embodiment of this application, the first VIU processes the second data from the plurality of automobile parts to obtain the first data. To be more specific, the first VIU replaces the ECUs in the plurality of automobile parts, to implement the processing function. This helps reduce the costs of the ECUs in the automobile parts.

In a possible implementation, the first VIU is configured to implement some or all electronic control functions of the plurality of automobile parts. In other words, the first VIU is configured to implement some or all functions of the ECUs located in the plurality of automobile parts.

In this embodiment of this application, the first VIU implements some or all functions of the ECUs located in the plurality of automobile parts. The functions of the ECUs in the automobile part are simplified. This helps reduce the costs of the ECUs in the automobile parts, and finally reduce the costs of the automobile parts.

Optionally, the ECUs in the plurality of automobile parts no longer perform some or all of the functions.

In this embodiment of this application, the first VIU implements some or all functions of the ECUs located in the plurality of automobile parts. Correspondingly, the automobile parts do not need to have all functions of the ECUs. This helps reduce the costs of the automobile parts.

Optionally, the ECUs are not disposed in the plurality of automobile parts.

In this embodiment of this application, the first VIU implements some or all functions of the ECUs located in the plurality of automobile parts. Correspondingly, the automobile parts do not need to have the ECUs. This helps reduce the costs of the automobile parts.

In a possible implementation, the automobile includes a plurality of VIUs. The plurality of VIUs include the first VIU, and the plurality of VIUs form a ring communications network.

In this embodiment of this application, the plurality of VIUs form the ring communications network, such that the plurality of VIUs can communicate with each other. This helps improve flexibility and reliability of information (including data or control information) transmission in the system for implementing the automobile electronic control function.

In a possible implementation, the ring communications network is an Ethernet-based ring communications network. This helps improve an information transmission speed in the system for implementing the automobile electronic control function.

In a possible implementation, the automobile includes a plurality of VIUs, the plurality of VIUs include the first VIU, and any two different VIUs in the plurality of VIUs have a communication connection.

In this embodiment of this application, any two different VIUs in the plurality of VIUs have the communication connection, such that the plurality of VIUs can communicate with each other. This helps improve the flexibility and the reliability of information (including the data or the control information) transmission in the system for implementing the automobile electronic control function.

Optionally, a quantity of the plurality of VIUs is any one of the following: 3, 4, 2, and 5.

In a possible implementation, the plurality of automobile parts are a first automobile part set. The automobile further includes a second automobile part set. The plurality of VIUs further include a second VIU. The first VIU is configured to control the first automobile part set. The second VIU is configured to control the second automobile part set. The method further includes: The first VIU receives control information of the second automobile part set if the second VIU fails; and the first VIU controls an automobile part in the second automobile part set based on the control information of the second automobile part set.

In this embodiment of this application, after the second VIU fails, the first VIU may take over the second VIU to control the plurality of automobile parts. This helps improve reliability of the control function in the system.

In a possible implementation, the plurality of automobile parts are the first automobile part set. The automobile further includes a third automobile part set. The plurality of VIUs further include a third VIU. The first VIU is configured to provide a data processing function for the first automobile part set. The third VIU is configured to provide a data processing function for the third automobile part set. The method further includes: The first VIU obtains data of the third automobile part set if the third VIU fails; and the first VIU sends the data of the third automobile part set.

In this embodiment of this application, after the third VIU fails, the first VIU may take over the third VIU to forward data of the third automobile part set. This helps improve reliability of data transmission in the system.

In a possible implementation, the automobile further includes a second DC. The method further includes: The first VIU receives second control information sent by the second DC. The second control information is used to control some or all of the plurality of automobile parts.

In this embodiment of this application, the first VIU may further receive the control information from the second DC, to control some or all of the plurality of automobile parts. This helps improve control flexibility of the system.

In a possible implementation, the first DC is an intelligent driving domain controller of the automobile. The second DC includes a chassis domain controller of the automobile.

In this embodiment of this application, both the intelligent driving domain controller and the chassis domain controller may control the plurality of automobile parts using the first VIU. This helps improve the control flexibility of the system.

According to a sixth aspect, this application provides a method for implementing an automobile electronic control function. The automobile includes a first VIU and a plurality of automobile parts. The method includes: The first VIU obtains first data from the plurality of automobile parts; and the first VIU sends the first data to a first DC of the automobile and/or a CCP of the automobile.

In this embodiment of this application, the first VIU forwards the first data from the plurality of automobile parts. To be more specific, the first VIU replaces ECUs in the plurality of automobile parts, to implement a data forwarding function. Therefore, ECUs in all automobile parts do not need to implements the data forwarding function separately in a conventional system for implementing an automobile electronic control function, to simplify functions of the ECUs in the automobile parts. This helps reduce costs of the ECUs in the automobile parts, and finally reduce costs of the automobile parts.

In addition, in the system that is for implementing the automobile electronic control function and that is provided in this application, the plurality of automobile parts may be connected to one first VIU, and are connected to the DC or the CCP using the first VIU, to avoid a case in which each automobile part in the conventional system for implementing the automobile electronic control function needs to be connected to the DC or the CCP using a respective wiring harness. This helps reduce a length of the wiring harness in the system for implementing the automobile electronic control function.

In a possible implementation, that the first VIU obtains first data from the plurality of automobile parts includes: The first VIU obtains second data from the plurality of automobile parts; and the first VIU processes the second data to obtain the first data. The processing includes one or more of the following operations: processing the second data, converting a protocol of the second data, encapsulating the second data according to a transport protocol, or converting a data format of the second data.

In this embodiment of this application, the first VIU processes the second data from the plurality of automobile parts to obtain the first data. To be more specific, the first VIU replaces the ECUs in the plurality of automobile parts, to implement the processing function. This helps reduce the costs of the ECUs in the automobile parts.

In a possible implementation, the first VIU is configured to implement some or all electronic control functions of the plurality of automobile parts. In other words, the first VIU is configured to implement some or all functions of the ECUs located in the plurality of automobile parts.

In this embodiment of this application, the first VIU implements some or all functions of the ECUs located in the plurality of automobile parts. The functions of the ECUs in the automobile part are simplified. This helps reduce the costs of the ECUs in the automobile parts, and finally reduce the costs of the automobile parts.

Optionally, the ECUs in the plurality of automobile parts no longer perform some or all of the functions.

In this embodiment of this application, the first VIU implements some or all functions of the ECUs located in the plurality of automobile parts. Correspondingly, the automobile parts do not need to have all functions of the ECUs. This helps reduce the costs of the automobile parts.

Optionally, the ECUs are not disposed in the plurality of automobile parts.

In this embodiment of this application, the first VIU implements some or all functions of the ECUs located in the plurality of automobile parts. Correspondingly, the automobile parts do not need to have the ECUs. This helps reduce the costs of the automobile parts.

In a possible implementation, that the first VIU obtains first data from the plurality of automobile parts includes: The first VIU collects the first data from a sensible element and/or an execution element of the plurality of automobile parts.

In this embodiment of this application, the first VIU may directly collect the first data from the sensible element and/or the execution element of the plurality of automobile parts. To be more specific, a data collection function of the ECU in the plurality of automobile parts is replaced. This helps reduce the costs of the automobile parts.

In a possible implementation, the automobile includes a plurality of VIUs. The plurality of VIUs include the first VIU, and the plurality of VIUs form a ring communications network.

In this embodiment of this application, the plurality of VIUs form the ring communications network, such that the plurality of VIUs can communicate with each other. This helps improve flexibility and reliability of information (including data or control information) transmission in the system for implementing the automobile electronic control function.

In a possible implementation, the ring communications network is an Ethernet-based ring communications network. This helps improve an information transmission speed in the system for implementing the automobile electronic control function.

In a possible implementation, the automobile includes a plurality of VIUs, the plurality of VIUs include the first VIU, and any two different VIUs in the plurality of VIUs have a communication connection.

In this embodiment of this application, any two different VIUs in the plurality of VIUs have the communication connection, such that the plurality of VIUs can communicate with each other. This helps improve the flexibility and the reliability of information (including the data or the control information) transmission in the system for implementing the automobile electronic control function.

In a possible implementation, the plurality of automobile parts are a first automobile part set. The automobile further includes a second automobile part set. The plurality of VIUs further include a second VIU. The first VIU is configured to provide a data processing function for the first automobile part set. The second VIU is configured to provide a data processing function for the second automobile part set. The method further includes: The first VIU obtains data of the second automobile part set if the second VIU fails; and the first VIU sends the data of the second automobile part set.

In this embodiment of this application, after the second VIU fails, the first VIU may take over the second VIU to forward the data of the second automobile part set. This helps improve reliability of data transmission in the system.

In a possible implementation, the system for implementing the automobile electronic control function further includes a second DC. The method further includes: The first VIU sends the first data to the second DC.

In this embodiment of this application, the first VIU may further send the first data to the second DC. This helps improve flexibility of data transmission in the system.

According to a seventh aspect, this application further provides an automobile. The automobile includes any system for implementing an automobile electronic control function in the first aspect to the fourth aspect.

According to an eighth aspect, a VIU is provided. The VIU may be a controller in an automobile, or a chip in an automobile. The VIU may include a processing unit and an obtaining unit. The processing unit may be a processor, and the obtaining unit may be an input/output interface. The VIU may further include a storage unit. The storage unit may be a memory. The storage unit is configured to store an instruction. The processing unit executes the instruction stored in the storage unit, such that the VIU performs steps performed by the first VIU in the foregoing aspects.

Optionally, the storage unit may be a storage unit (for example, a register or a cache) in the VIU, or an external storage unit (for example, a read-only memory or a random-access memory) of the VIU.

In the eighth aspect, that a memory is coupled to a processor may be understood as that the memory is located in the processor, or that the memory is located outside the processor, such that the memory is independent of the processor.

According to a ninth aspect, a computer program product is provided. The computer program product includes computer program code. When the computer program code is run on a computer, the computer is enabled to perform the methods in the foregoing aspects.

It should be noted that some or all of the computer program code may be stored in a first storage medium. The first storage medium may be encapsulated with a processor, or may be encapsulated separately from a processor. This is not specifically limited in this embodiment of this application.

According to a tenth aspect, a computer-readable medium is provided. The computer-readable medium stores program code. When the computer program code is run on a computer, the computer is enabled to perform the methods in the foregoing aspects.

DESCRIPTION OF EMBODIMENTS

The following describes technical solutions of this application with reference to accompanying drawings.

Figure 1:
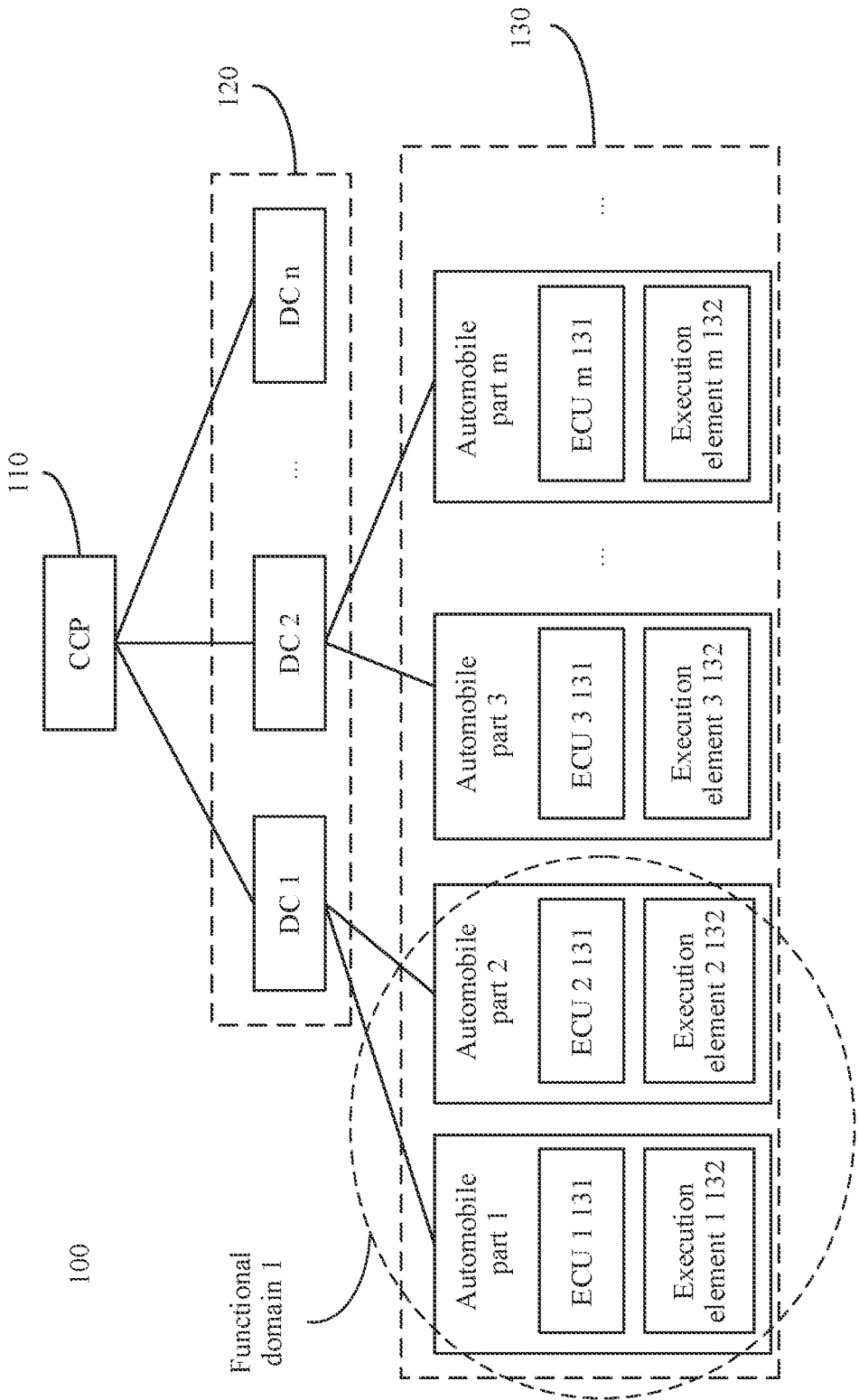
FIG. 1 is a schematic diagram of a conventional system for implementing an automobile electronic control function.

FIG. 1 is a schematic diagram of a conventional system for implementing an automobile electronic control function. The system 100 shown in FIG. 1 includes a CCP 110, n DCs 120, and m automobile parts 130, where n and m are positive integers.

The CCP 110 is in communication connection with the n DCs, and may receive data sent by a DC, or send control information to a DC. The CCP 110 may be understood as a general platform for automobile electronic control and information processing. Distributed computing and control systems (for example, ECUs or DCs) in the automobile are optimized and integrated to implement network-based and integrated control and management of functional modules of automobile computing, control, and communication, and maximize real-time sharing of software and hardware resources, such as automobile computing and control.

Each DC 120 is configured to manage a functional domain in the automobile. In other words, the DC is in communication connection with a plurality of automobile parts located in the functional domain. A DC 120 is configured to control an automobile part in a corresponding functional domain, or provide a data processing function for an automobile part in a corresponding functional domain.

Functional domains are usually divided based on functions of automobile parts in the automobile, and each functional domain has an independent domain controller, namely, a DC. DCs in the automobile may usually include a self-driving domain controller, a cockpit domain controller (CDC), a vehicle domain controller (VDC), and the like.

The self-driving domain controller is configured to provide services for automobile parts in an intelligent driving domain. The automobile parts in the intelligent driving domain include a monocular camera, a binocular camera, a millimeter-wave radar, a lidar, an ultrasonic radar, and the like.

It should be noted that a function of the self-driving domain controller may be implemented by a mobile data center (MDC).

The CDC is configured to provide services for automobile parts in a cockpit domain. The automobile parts in the cockpit domain include a head-up display, an instrument display, a radio, navigation, a surround-view camera, and the like.

The VDC is configured to provide services for automobile parts in a vehicle body domain and automobile parts in a chassis domain. The automobile parts in the vehicle body domain include a door/window lifting controller, an electric rear-view mirror, an air conditioner, a central lock, and the like. The automobile parts in the chassis domain include an automobile part in a braking system, an automobile part in a steering system, a throttle, and the like.

An automobile part 130 may include an ECU 131 and an execution element 132. For example, the automobile part 130 may be a sensor or an actuator in the automobile.

The ECU 131 is located in the automobile part, and is configured to provide electronic control functions for the automobile part. For example, the ECU 131 is an electronic control unit in a rain wiper, an electronic control unit located in an automobile door, or the like.

The electronic control functions mainly include a logic control function and a data processing function. The logic control function includes controlling, based on obtained control information, the automobile part to perform an operation. For example, the logic control function includes controlling an action of the rain wiper based on the control information. For another example, the logic control function includes controlling an on/off state of a door lock on the automobile door based on the control information. The data processing function includes processing to-be-processed data in the automobile part. For example, the data processing function includes performing data fusion on weather information collected using a sensible element of the rain wiper and running data of the rain wiper. For another example, the data processing function includes performing data fusion on fingerprint information obtained using a sensible element of the door lock on the automobile door and on/off state information of the automobile door.

It should be noted that, unless otherwise specified, the ECU in this embodiment of this application indicates an electronic control element located in the automobile part, and is different from an "electric control unit" (also referred to as an engine control unit) in other approaches. The engine control unit is located outside a plurality of automobile parts in an engine system, is configured to control the plurality of automobile parts in the engine system, and may be considered as an independent centralized controller. However, the electronic control unit in this embodiment of this application, namely, an "ECU" below, indicates an electronic control unit located in the automobile part. For example, the electronic control unit may be electronic control units located in the plurality of automobile parts in the engine system.

Figure 2:
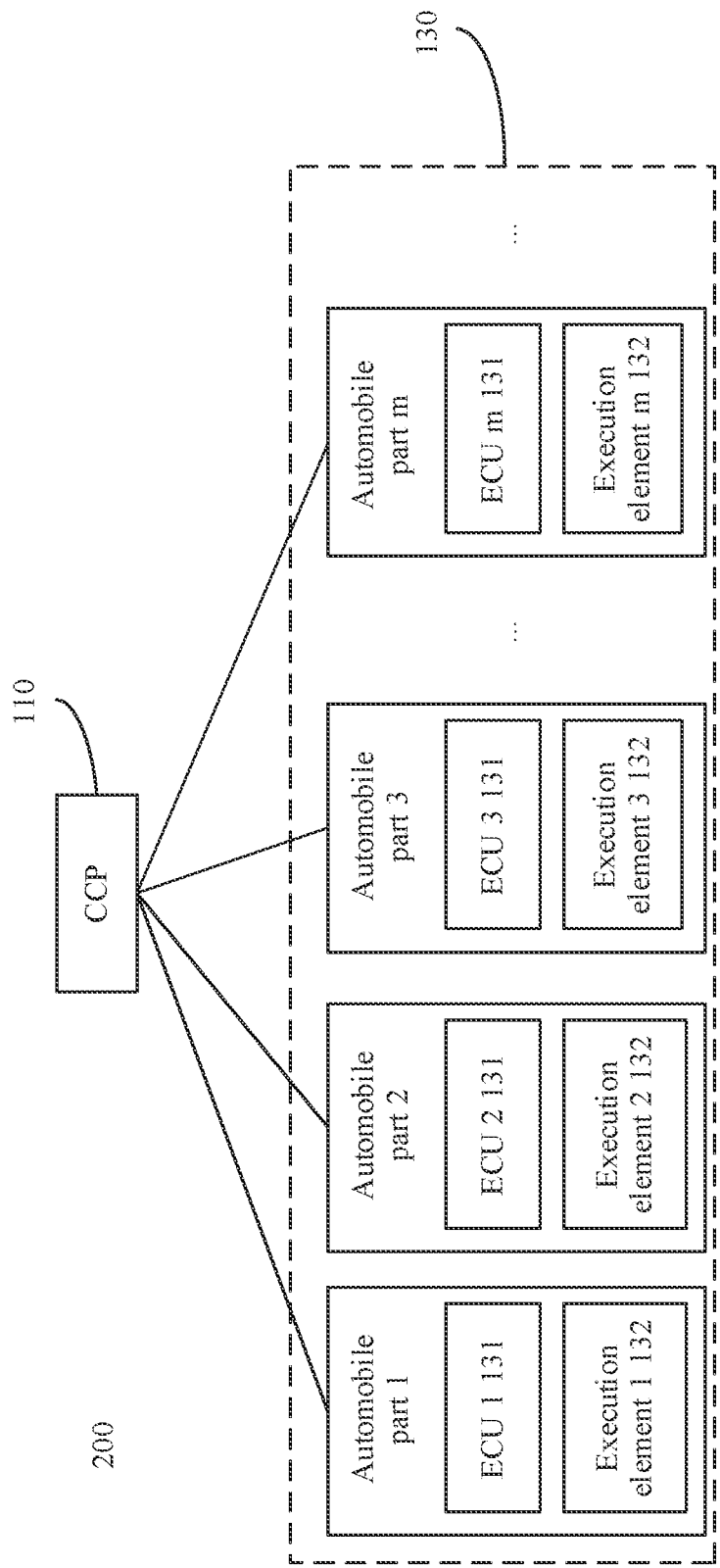
FIG. 2 is a schematic diagram of another conventional system for implementing an automobile electronic control function.

It should be noted that FIG. 1 shows only a possible implementation of the system for implementing the automobile electronic control function. The conventional in-vehicle system for implementing the automobile electronic control function may have another variation. For example, FIG. 2 shows another system for implementing an automobile electronic control function. To be more specific, an automobile part 130 is no longer in communication connection with a CCP 110 using a DC 120, but may be directly in communication connection with the CCP 110.

It should be understood that, in the system that is for implementing the automobile electronic control function and that is shown in FIG. 2, functions of components, such as the automobile part and the CCP are similar to or the same as functions of components such as the automobile part and the CCP shown in FIG. 1. For brevity, details are not described herein again.

In both the system that is for implementing the automobile electronic control function and that is shown in FIG. 1 or the system that is for implementing the automobile electronic control function and that is shown in FIG. 2, to implement electronization of the automobile and meet requirements for implementing various functions of the automobile, each automobile part has an independent ECU. The manner in which ECUs are distributively arranged results in higher costs of the automobile parts.

In addition, the manner in which the ECUs are distributively arranged results in long lengths of wiring harnesses used for communication between the ECU and the DC and between the ECU and the CCP in the in-vehicle system for implementing the automobile electronic control function and high costs of the in-vehicle system for implementing the automobile electronic control function.

To avoid the foregoing problem, this application provides a new system for implementing an automobile electronic control function. To be more specific, a vehicle integration unit (VIU), also referred to as a "vehicle integrated unit", is added to the system for implementing the automobile electronic control function. The VIU provides a plurality of automobile parts, with some or all of data processing functions or control functions required by the automobile parts. In this way, in a solution in which one VIU serves the plurality of automobile parts, ECUs in all automobile parts do not need to implement the data processing functions or the control functions in the conventional system for implementing the automobile electronic control function. This helps reduce costs of the automobile parts.

In addition, in the system that is for implementing the automobile electronic control function and that is provided in this application, the plurality of automobile parts may be connected to the VIU, and are connected to a DC or a CCP using the VIU, to avoid a case in which each automobile part in the conventional system for implementing the automobile electronic control function needs to be connected to the DC or the CCP using a respective wiring harness. This helps reduce a length of the wiring harness in the system for implementing the automobile electronic control function.

Figure 3:
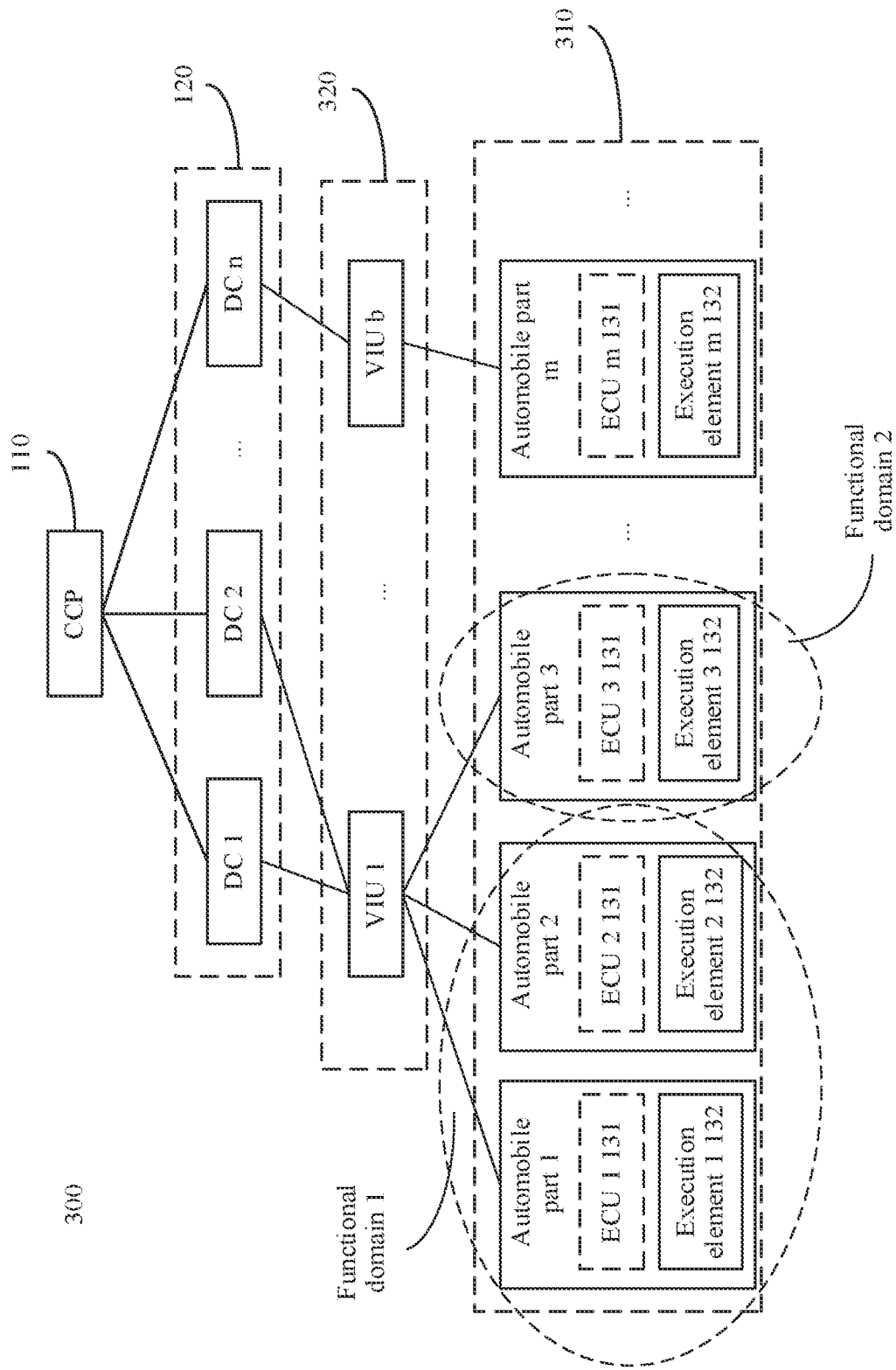
FIG. 3 is a schematic diagram of a system for implementing an automobile electronic control function according to an embodiment of this application.
Figure 4:
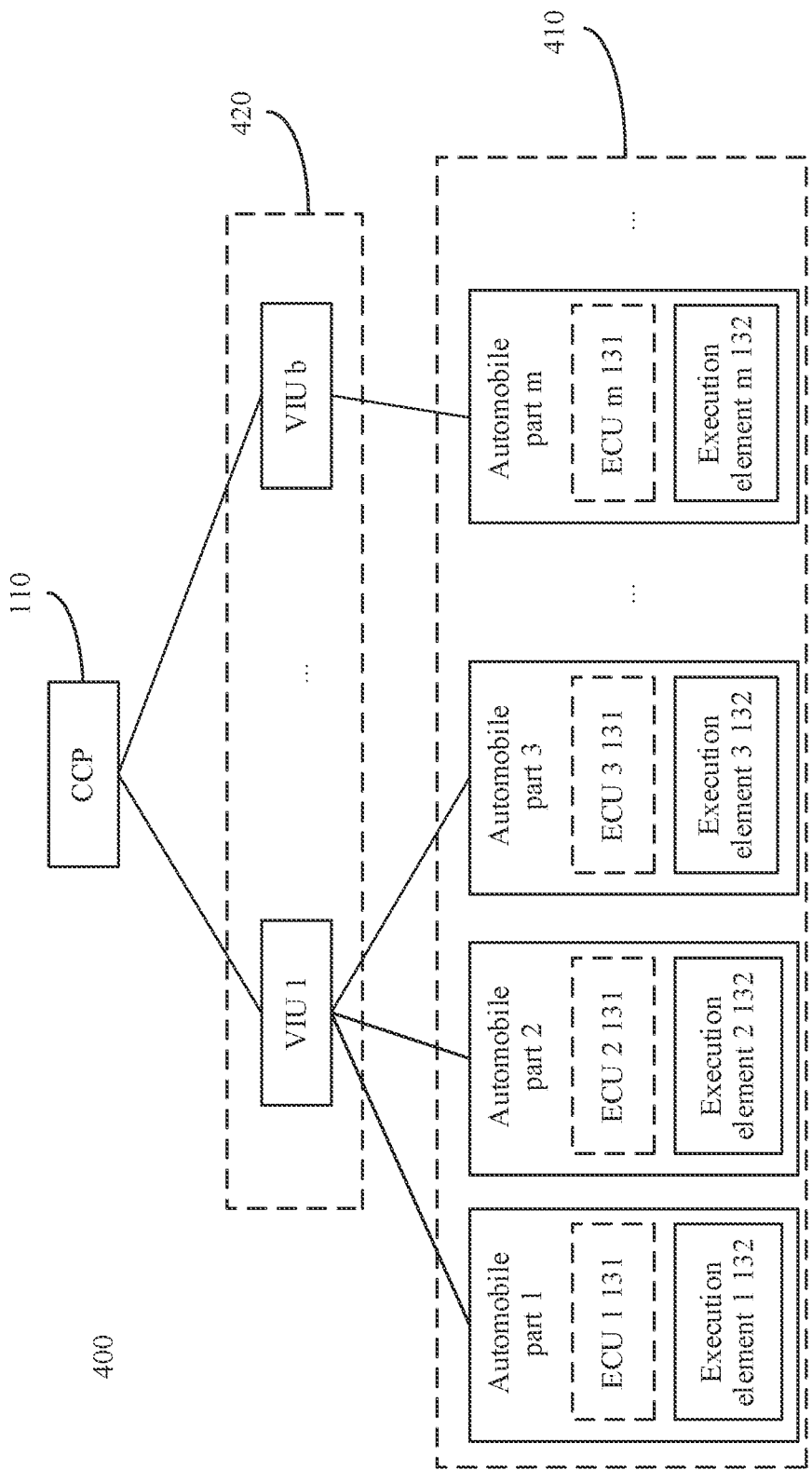
FIG. 4 is a schematic diagram of a system for implementing an automobile electronic control function according to another embodiment of this application.

The following describes, with reference to FIG. 3 to FIG. 8, a schematic diagram of the system for implementing the automobile electronic control function according to this application. A system 300 that is for implementing an automobile electronic control function and that is shown in FIG. 3 may be understood as improvement on the system 100 that is for implementing the automobile electronic control function and that is shown in FIG. 1. A system 400 that is for implementing an automobile electronic control function and that is shown in FIG. 4 may be understood as improvement on the system 200 that is for implementing the automobile electronic control function and that is shown in FIG. 2.

It should be noted that, in the embodiments of this application, the system for implementing the automobile electronic control function may be applied to an intelligent automobile, a new energy automobile, a conventional automobile, or the like. New energy automobiles include a pure electric automobile, an extended-range electric automobile, a hybrid electric automobile, a fuel cell electric automobile, a hydrogen engine automobile, or another new energy automobile. Conventional automobiles include a gasoline automobile, a diesel automobile, and the like. This is not limited in the embodiments of this application.

FIG. 3 is a schematic diagram of the system for implementing the automobile electronic control function according to an embodiment of this application. It should be understood that units that have a same function in the system that is for implementing the automobile electronic control function and that is shown in FIG. 3 and the system that is for implementing the automobile electronic control function and that is shown in FIG. 1 use a same number. For brevity, details are not described herein again.

As shown in FIG. 3, the system 300 for implementing the automobile electronic control function includes a CCP 110, n DCs 120, m automobile parts 310, and b VIUs 320, where b, n, and m are positive integers.

The automobile parts 310 may include one or more of the following automobile parts: automobile parts having some or all functions of ECUs; and automobile parts without an electronic control function.

It may be understood that the automobile part 310 having all the electronic control functions is the same as the automobile part 130 in FIG. 1.

It may be understood that the automobile part 310 having some of the electronic control functions has fewer electronic control functions than the automobile part 130 in FIG. 1.

It may be understood that the automobile part 310 without some of the electronic control functions is the automobile part 310 without an ECU.

A VIU 320 is in communication connection with a plurality of automobile parts 310, and is in communication connection with a DC in the automobile. For example, in FIG. 3, a VIU 1 is in communication connection with an automobile part 1, an automobile part 2, and an automobile part 3, and is also in communication connection with a DC 1 and a DC 2.

It should be noted that the communication connection may be understood as a wireless connection or a wired connection for information exchange. This is not limited in this embodiment of this application. It may be understood that the wireless connection is that the VIU does not need to communicate with another unit in the automobile through a bus. For example, Bluetooth communication, or Wi-Fi communication may be used. It may be understood that the wired connection is that the VIU communicates with another unit in the automobile based on a bus. For example, a controller area network (CAN) bus, a local interconnect network (LIN) bus, or an Ethernet communications technology may be used.

Optionally, the VIU may be in communication connection with a DC in the automobile. For example, a VIU b is in communication connection with a DC n shown in FIG. 3. The VIU may further be in communication connection with a plurality of DCs in the automobile. For example, a VIU 1 shown in FIG. 4 may be in communication connection with both a DC 1 and a DC 2.

In a conventional system for implementing an automobile electronic control function, one DC usually communicates with a plurality of automobile parts in one functional domain. As shown in FIG. 1, a DC 1 may be in communication connection with an automobile part 1 and an automobile part 2 in a functional domain 1. To be compatible with the conventional system for implementing the automobile electronic control function, a plurality of automobile parts belonging to one functional domain and a DC corresponding to the functional domain usually communicate with one VIU, such that the DC can control all automobile parts using the VIU. This reduces changes to the conventional electronic control function system.

Optionally, one VIU may serve any functional domain in the automobile. For example, in the system 300 for implementing the automobile electronic control function as shown in FIG. 3, the automobile part 1 and the automobile part 2 that are in communication connection with the VIU 1 belong to a same functional domain, namely, a functional domain 1. In addition, the DC 1 that is in communication connection with the VIU1 is a DC corresponding to the functional domain 1.

The functional domain served by the VIU may be a vehicle domain. The VIU may be in communication connection with the VDC, an automobile part in a vehicle body domain, and an automobile part in a chassis domain. The functional domain served by the VIU may be a cockpit domain. The VIU may be in communication connection with the CDC and an automobile part in the cockpit domain. The functional domain served by the VIU may further be an intelligent driving domain. The VIU may be in communication connection with an MDC and an automobile part in the intelligent driving domain.

Optionally, one VIU may also serve a plurality of functional domains. In other words, the VIU is in communication connection with automobile parts in the plurality of functional domains and a DC. For example, in the system 300 shown in FIG. 3, the DC 1 is a DC in the functional domain 1, and the DC 2 is a DC in a functional domain 2. Automobile parts in the functional domain 1 include an automobile part 1 and an automobile part 2. An automobile part in the functional domain 2 is an automobile part 3. The VIU 1 is in communication connection with the DC 1 and the DC 2, and the VIU 1 is also in communication connection with automobile parts in the functional domain 1 and the functional domain 2.

The VIU may provide services for two functional domains. In other words, the VIU is in communication connection with automobile parts in the two functional domains and the DCs. The two functional domains may be any two functional domains in the automobile. For example, the two functional domains may be a vehicle domain and a cockpit domain. DCs that are in communication connection with the VIU are a VDC and a CDC. Correspondingly, automobile parts that are in communication connection with the VIU are an automobile part in a vehicle body domain, an automobile part in a chassis domain, and an automobile part in the cockpit domain.

For another example, the two functional domains may be a vehicle domain and a mobile data center. DCs that are in communication connection with the VIU are a VDC and an MDC. Correspondingly, automobile parts that are in communication connection with the VIU are an automobile part in a vehicle body domain, an automobile part in a chassis domain, and an automobile parts in an intelligent driving domain.

For another example, the two functional domains may be a cockpit domain and a mobile data center. DCs that are in communication connection with the VIU are a CDC and an MDC. Correspondingly, automobile parts that are in communication connection with the VIU are an automobile part in the cockpit domain, and an automobile parts in an intelligent driving domain.

The VIU may provide services for three functional domains. In other words, the VIU is in communication connection with automobile parts in the three functional domains and DCs. For example, the three functional domains may be a vehicle domain, a cockpit domain, and a self-driving domain. DCs that are in communication connection with the VIU are a VDC, a CDC, and an MDC. Correspondingly, automobile parts that are in communication connection with the VIU are an automobile part in a vehicle body domain, an automobile part in a chassis domain, an automobile part in the cockpit domain and a part in an intelligent driving domain.

Certainly, if a conventional electronic function control architecture is not considered, there are many connection manners between the VIU and an automobile part and between the VIU and the DC. This is not limited in this embodiment of this application. For example, a DC corresponding to a functional domain and an automobile part in the functional domain may be connected to different VIUs. For another example, the VIU is in communication connection with only some automobile parts in a functional domain. For another example, an automobile part served by the VIU may have no relationship with a functional domain. The automobile parts served by each VIU may be determined based on other factors such as a physical position of an automobile part in the automobile.

FIG. 4 is a schematic diagram of the system for implementing the automobile electronic control function according to another embodiment of this application. It should be understood that units that have a same function in the system 400 shown in FIG. 4 and the system 100 shown in FIG. 1 use a same number. For brevity, details are not described herein again.

The system 400 that is for implementing the automobile electronic control function and that is shown in FIG. 4 includes a CCP 110, n DCs 120, m automobile parts 410, and b VIUs 420, where b, n, and m are positive integers.

The automobile parts 410 may include one or more of the following automobile parts: automobile parts having some or all functions of ECUs; and automobile parts without an electronic control function.

It may be understood that the automobile part 410 having all the electronic control functions is the same as the automobile part 130 in FIG. 1.

It may be understood that the automobile part 410 having some of the electronic control functions has fewer electronic control functions than the automobile part 130 in FIG. 1.

It may be understood that the automobile part 410 without some of the electronic control functions is the automobile part 410 without an ECU.

A VIU 420 is in communication connection with a plurality of automobile parts 410, and is in communication connection with the CCP 110 in the automobile. For example, in FIG. 4, a VIU 1 is in communication connection with an automobile part 1, an automobile part 2, and an automobile part 3, and is in communication connection with the CCP 110.

It should be noted that the communication connection may be understood as a wireless connection or a wired connection. This is not limited in this embodiment of this application. It may be understood that the wireless connection is that the VIU does not need to communicate with another unit in the automobile through a bus. For example, Bluetooth communication, or Wi-Fi communication may be used. It may be understood that the wired connection is that the VIU communicates with another unit in the automobile based on a bus. For example, a CAN bus, a LIN bus, or an Ethernet communications technology may be used.

Optionally, the VIU may provide services for all or some of the automobile parts in the automobile. When the VIU provides services for some automobile parts, another automobile part that is in the automobile and that is not in communication connection to the VIU may directly communicate with the CCP, or may communicate with the CCP using another VIU. This is not limited in this embodiment of this application.

The foregoing separately describes, with reference to FIG. 3 and FIG. 4, the system 300 for implementing the automobile electronic control function and the system 400 for implementing the automobile electronic control function. The following mainly describes communication manners between a plurality of VIUs when the foregoing two electronic control architectures include the plurality of VIUs.

As described above, in both the system 300 shown in FIG. 3 or in the system 400 shown in FIG. 4, the automobile may include one or more VIUs. When the automobile includes one VIU, the VIU may provide services for all or some automobile parts in the automobile. When the automobile includes a plurality of VIUs, different VIUs in the plurality of VIUs may provide services for different automobile parts, or provide services for at least some same automobile parts.

To improve flexibility and reliability of information (including data or control information) transmission in the system for implementing the automobile electronic control function, the plurality of VIUs may communicate with each other. A communication manner may be a bus-based communication manner. For example, the VIU communicates with another VIU in the automobile based on a CAN bus. For another example, the VIU communicates with another VIU in the automobile based on a LIN bus. For another example, the VIU communicates with another VIU in the automobile based on a high-speed communications protocol. The high-speed communications protocol may be an Ethernet communications protocol. The communication manner may further be a wireless communication manner. For example, the VIU may communicate with the other VIU in the automobile based on a Bluetooth technology. For another example, the VIU may communicate with the other VIU in the automobile based on a Wi-Fi technology.

There are a plurality of communication connection manners for the plurality of VIUs. This is not specifically limited in the embodiments of this application. For example, any two VIUs of the plurality of VIUs are in communication connection, or one of the plurality of VIUs and another VIU are in communication connection, or the plurality of VIUs form a ring communications network. With reference to FIG. 5 to FIG. 8, the following describes, using an example in which an automobile includes three or four VIUs, a solution in which a plurality of VIUs form a ring communications network according to the embodiments of this application.

Figure 5:
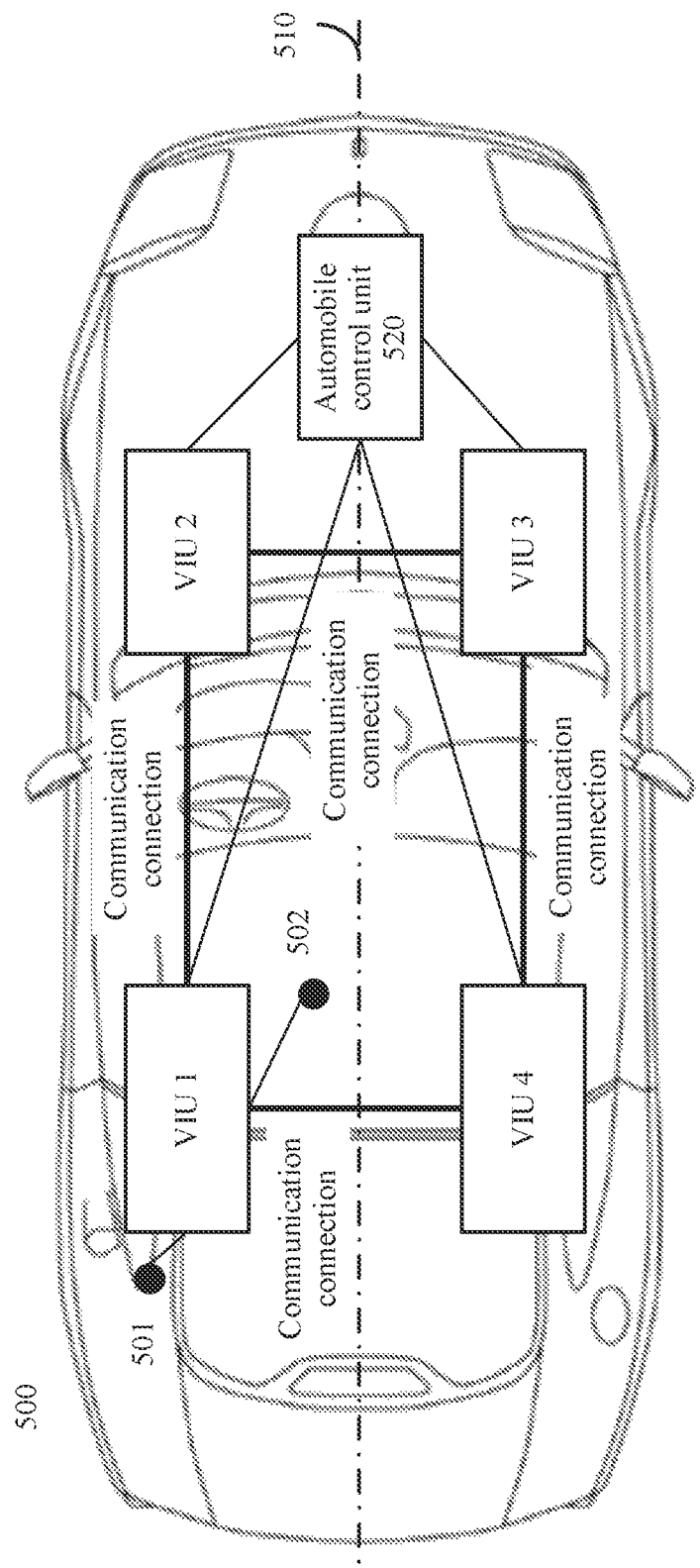
FIG. 5 is a schematic diagram of a topology structure of a plurality of VIUs in an automobile according to an embodiment of this application.

With reference to FIG. 5, the following describes, using an example in which an automobile includes four VIUs, a solution in which a plurality of VIUs form a ring communications network according to an embodiment of this application. The automobile 500 shown in FIG. 5 includes a VIU 1, a VIU 2, a VIU 3, and a VIU 4. The four VIUs may be arranged in the automobile in a rectangular formation such as shown in FIG. 5. A group of opposite edges of the rectangular is parallel to a symmetry axis 510 of the automobile, and the other group of opposite edges of the rectangle is perpendicular to the symmetry axis 510 of the automobile. The VIU 1 and the VIU 2 are in communication connection. The VIU 2 and the VIU 3 are in communication connection. The VIU 3 and the VIU 4 are in communication connection. The VIU 4 and the VIU 1 are in communication connection. Therefore, the four VIUs form the ring communications network.

Optionally, a topology structure between the plurality of VIUs shown in FIG. 5 may be combined with the system 300 or the system 400. The automobile shown in FIG. 5 further includes an automobile control unit 520, an automobile part 501, and an automobile part 502. The automobile control unit 510 may be the DC in the system 300. Alternatively, the automobile control unit 510 may be the CCP in the system 400.

It should be noted that, for ease of understanding, FIG. 5 shows only some automobile parts 501 and automobile parts 502 served by the VIU 1. Another automobile part served by the VIU 1 is not shown in the diagram.

Figure 6:
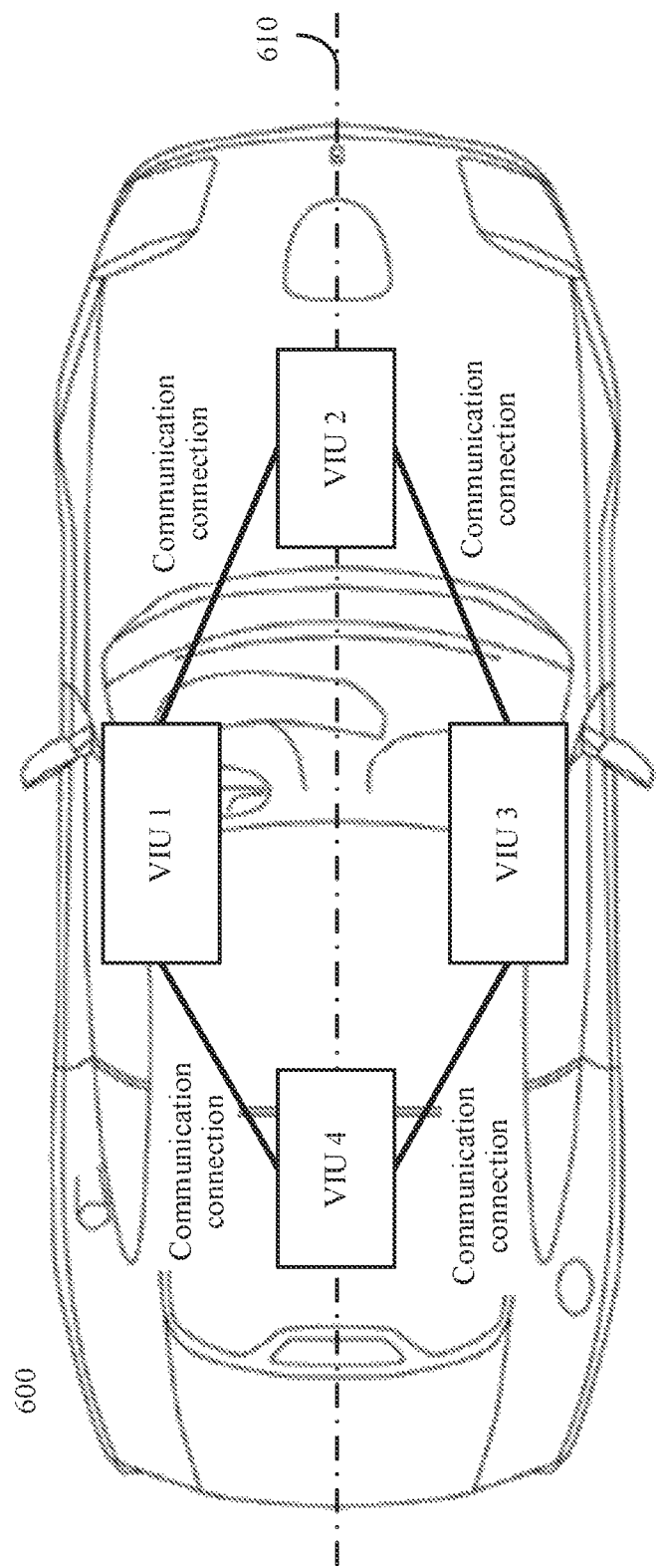
FIG. 6 is a schematic diagram of a topology structure of a plurality of VIUs in an automobile according to another embodiment of this application.

With reference to FIG. 6, the following describes, using an example in which an automobile includes four VIUs, a solution in which a plurality of VIUs form a ring communications network according to another embodiment of this application. The automobile 600 shown in FIG. 6 includes a VIU 1, a VIU 2, a VIU 3, and a VIU 4. The four VIUs may be arranged in the automobile in a "rhombus" formation. A diagonal of the rhombus is parallel to a symmetry axis 610 of the automobile, and another diagonal of the rhombus is perpendicular to the symmetry axis 610 of the automobile. The VIU 1 and the VIU 2 are in communication connection. The VIU 2 and the VIU 3 are in communication connection. The VIU 3 and the VIU 4 are in communication connection. The VIU 4 and the VIU 1 are in communication connection. Therefore, the four VIUs form the ring communications network.

Figure 7:
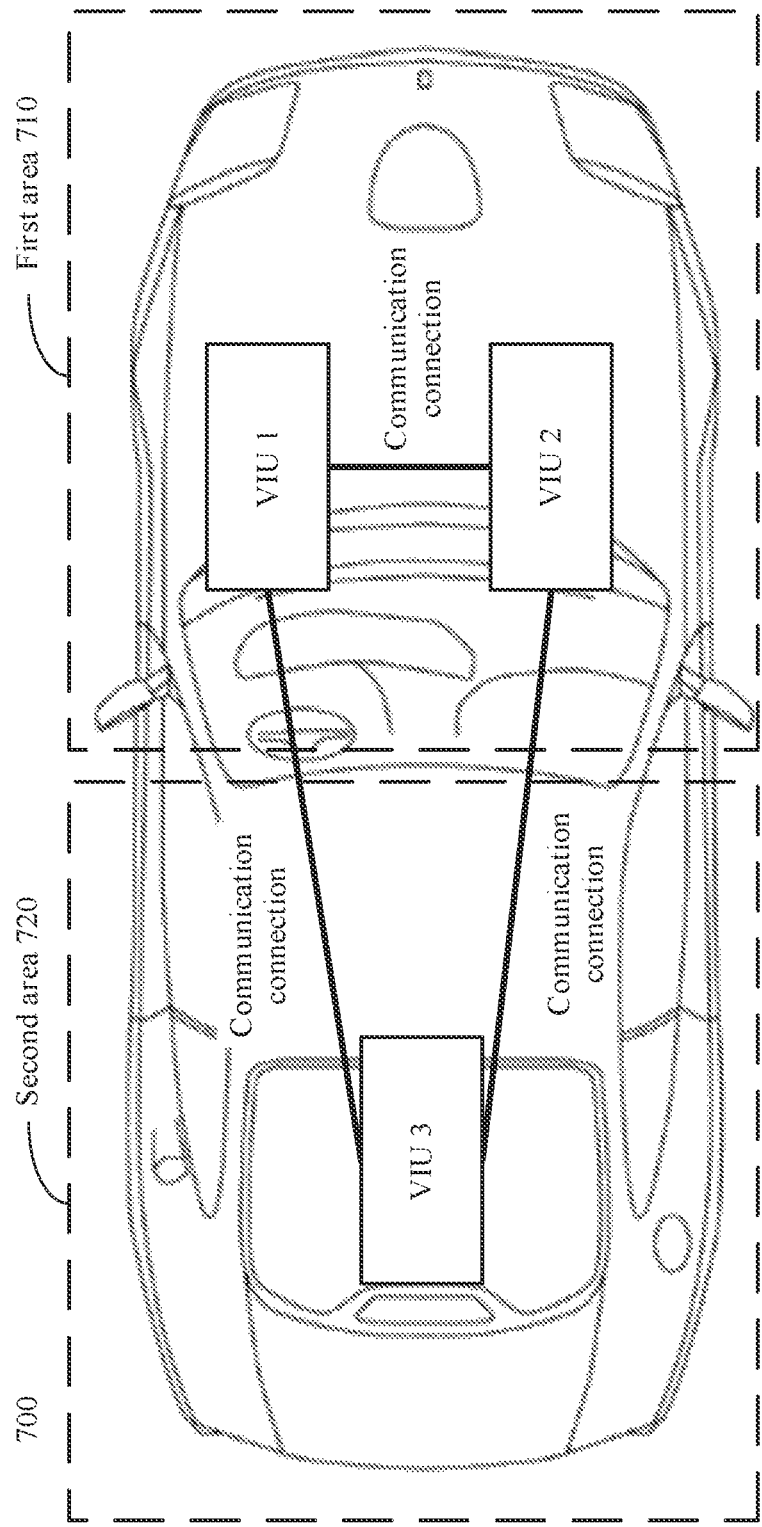
FIG. 7 is a schematic diagram of a topology structure of a plurality of VIUs in an automobile according to another embodiment of this application.

With reference to FIG. 7, the following describes, using an example in which an automobile includes three VIUs, a solution in which a plurality of VIUs form a ring communications network according to an embodiment of this application. The automobile 700 shown in FIG. 7 includes a VIU 1, a VIU 2, and a VIU 3. The VIU 1 and the VIU 2 are located in a first area 710 including a front of the automobile, and the VIU 3 is located in a second area 720 including a rear of the automobile. The VIU 1 and the VIU 2 are in communication connection. The VIU 2 and the VIU 3 are in communication connection. The VIU 3 and the VIU 1 are in communication connection. Therefore, the three VIUs form the ring communications network.

Figure 8:
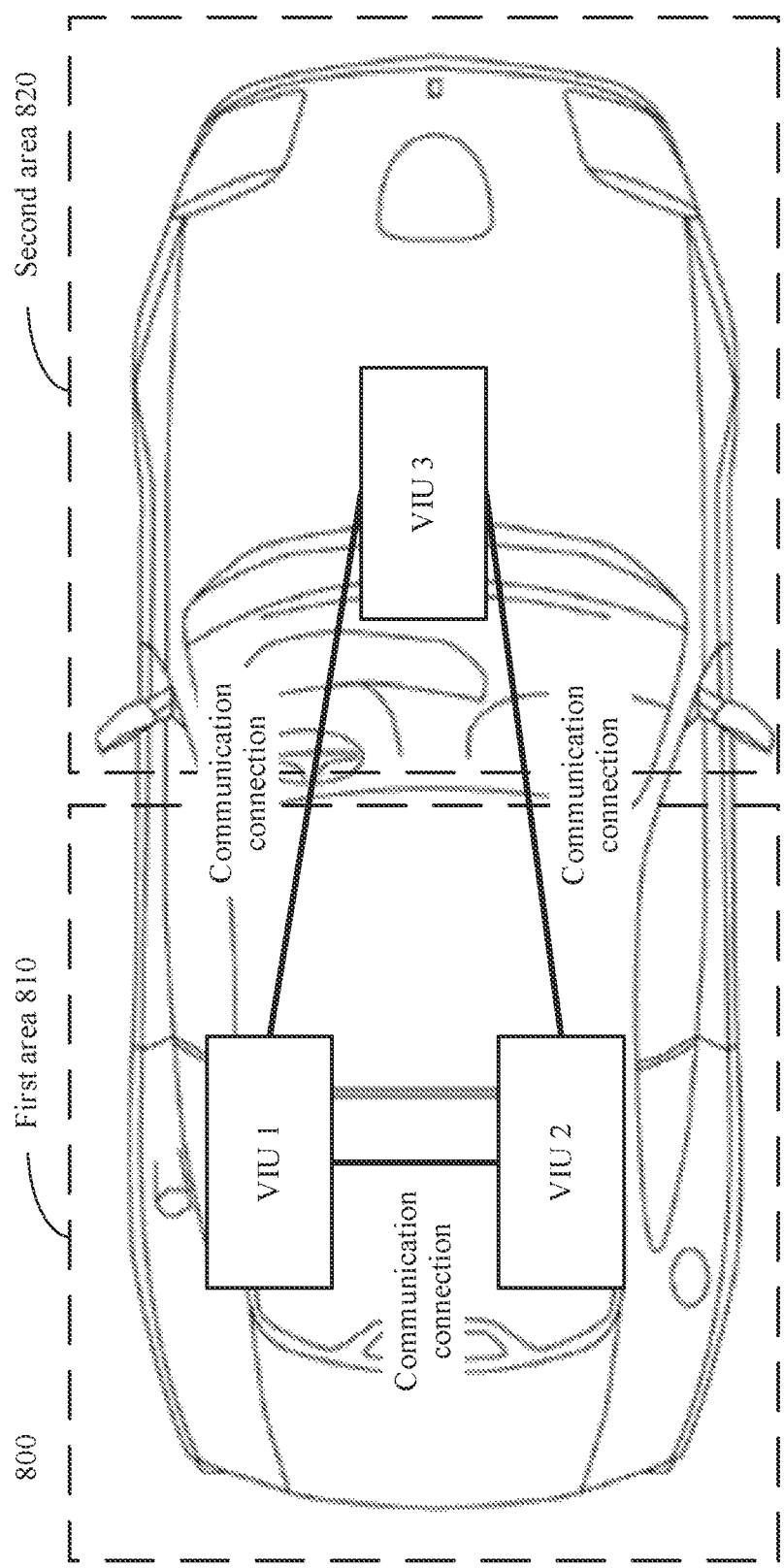
FIG. 8 is a schematic diagram of a topology structure of a plurality of VIUs in an automobile according to another embodiment of this application.

With reference to FIG. 8, the following describes, using an example in which an automobile includes three VIUs, a solution in which a plurality of VIUs form a ring communications network according to another embodiment of this application. The automobile 800 shown in FIG. 8 includes a VIU 1, a VIU 2, and a VIU 3. The VIU 1 and the VIU 2 are located in a first area 810 including a rear of the automobile, and the VIU 3 is located in a second area 820 including a front of the automobile. The VIU 1 and the VIU 2 are in communication connection. The VIU 2 and the VIU 3 are in communication connection. The VIU 3 and the VIU 1 are in communication connection. Therefore, the three VIUs form the ring communications network.

It should be noted that FIG. 5 to FIG. 8 merely show possible VIU arrangement methods in FIG. 4, and a specific position of the VIU in the automobile is not limited in this application.

A quantity of the plurality of VIUs included in the automobile is not specifically limited in the embodiments of this application. For example, there may be 2, 3, 4, or 5 VIUs.

Optionally, when the automobile includes the plurality of VIUs, a plurality of automobile parts served by each VIU may be obtained through division based on one or more of the following factors: a type of an interface used by an automobile part to transmit data in the automobile, a transmission type used by the automobile part to transmit the data in the automobile, a manufacturer of the automobile part in the automobile, a type of the automobile part in the automobile, a security level of the automobile part in the automobile, a service type of a service to which the data transmitted by the automobile part in the automobile belongs, or a service level of the service to which the data transmitted by the automobile part in the automobile belongs.

Optionally, when the automobile includes the plurality of VIUs, the plurality of VIUs may back up each other according to a preset rule, or one of the plurality of VIUs is configured to provide a backup function for another VIU. For an implementation process, refer to the following description.

Figure 9:
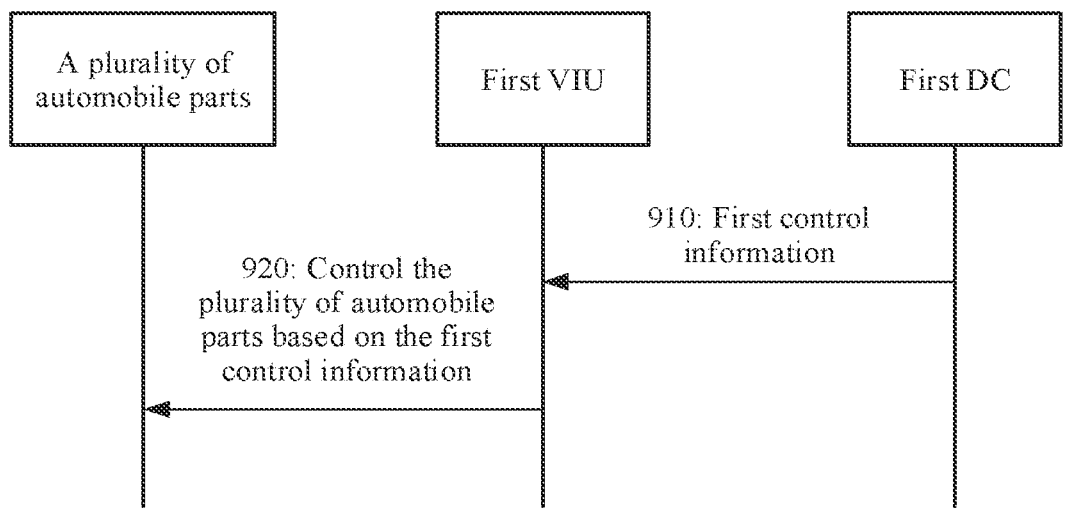
FIG. 9 is a flowchart of a control information transmission method according to an embodiment of this application.
Figure 10:
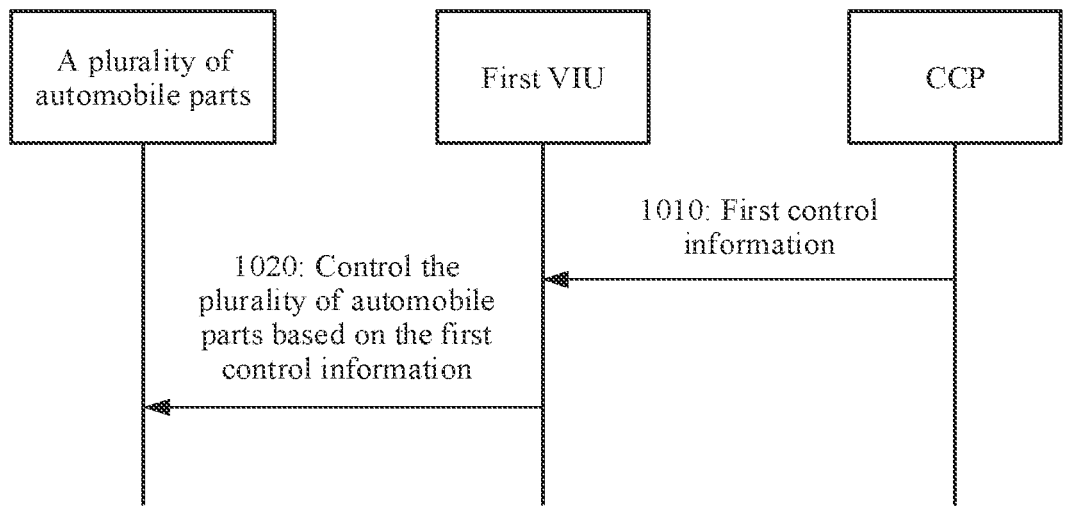
FIG. 10 is a flowchart of a control information transmission method according to another embodiment of this application.

Based on the system shown in FIG. 3 and the system shown in FIG. 4, the following describes a control information transmission method in the embodiments of this application with reference to FIG. 9 and FIG. 10.

FIG. 9 is a flowchart of a control information transmission method according to an embodiment of this application. It should be understood that the method shown in FIG. 9 may be performed by any VIU in the system 300 for implementing the automobile electronic control function. The VIU is referred to as a "first VIU" below. The method shown in FIG. 9 includes a step 910 and a step 920.

910: The first VIU receives first control information sent by a first DC.

The first DC is a DC that is in communication connection to the VIU. For example, when the first VIU is the VIU 1 shown in FIG. 3, the first DC may be the DC1 or the DC2.

Optionally, the first control information may be generated by the first DC, or may be sent by a CCP to the first DC.

920: The first VIU controls a plurality of automobile parts based on the first control information.

The plurality of automobile parts may be all automobile parts in an automobile, or some automobile parts in an automobile. This is not specifically limited in this embodiment of this application.

Optionally, when an electronic control architecture 300 includes a plurality of VIUs, a second VIU in the plurality of VIUs may provide a backup function for the first VIU to improve reliability of the electronic control architecture.

In other words, the plurality of automobile parts are a first automobile part set. The automobile further includes a second automobile part set. The first VIU is configured to control the first automobile part set. The second VIU is configured to control the second automobile part set. The first VIU is further configured to: receive control information of the second automobile part set if the second VIU fails; and control an automobile part in the second automobile part set based on the control information of the second automobile part set.

Optionally, when the electronic function control architecture 300 includes the plurality of VIUs, a third VIU in the plurality of VIUs may provide a backup function for the first VIU. The backup function mainly includes replacing the first VIU to control the plurality of automobile parts. The third VIU may be a VIU that is in the electronic function control architecture 300 and that is configured to provide the backup function. In other words, the third VIU usually does not control an automobile part. When a VIU (for example, the first VIU) in the electronic function control architecture 300 fails, the third VIU may replace the first VIU to control the plurality of automobile parts.

FIG. 10 is a flowchart of a control information transmission method according to another embodiment of this application. It should be understood that the method shown in FIG. 10 may be performed by any VIU in the system 400 for implementing the automobile electronic control function. The VIU is referred to as a "first VIU" below. The method shown in FIG. 10 includes a step 1010 and a step 1020.

1010: The first VIU receives first control information sent by a CCP in an automobile.

1020: The first VIU controls a plurality of automobile parts based on the first control information.

The plurality of automobile parts may be all automobile parts in the automobile, or some automobile parts in the automobile. This is not specifically limited in this embodiment of this application.

Optionally, when an electronic control architecture 400 includes a plurality of VIUs, a second VIU in the plurality of VIUs may provide a backup function for the first VIU to improve reliability of the electronic control architecture.

In other words, the plurality of automobile parts are a first automobile part set. The automobile further includes a second automobile part set. The first VIU is configured to control the first automobile part set. The second VIU is configured to control the second automobile part set. The first VIU is further configured to: receive control information of the second automobile part set if the second VIU fails; and control an automobile part in the second automobile part set based on the control information of the second automobile part set.

Optionally, when the electronic function control architecture 400 includes the plurality of VIUs, a third VIU in the plurality of VIUs may provide a backup function for the first VIU. The backup function mainly includes replacing the first VIU to control the plurality of automobile parts. The third VIU may be a VIU that is in the electronic function control architecture 400 and that is configured to provide the backup function. In other words, the third VIU usually does not control an automobile part. When a VIU (for example, the first VIU) in the electronic function control architecture 400 fails, the third VIU may replace the first VIU to control the plurality of automobile parts.

Optionally, as described above, the first VIU may be in communication connection with a plurality of DCs. For example, DCs that communicate with the first VIU include the first DC and the second DC. The first VIU is configured to receive second control information sent by the second DC. The second control information is used to control some or all of the plurality of automobile parts.

In this embodiment of this application, the VIU is connected to the plurality of DCs. This helps improve flexibility and reliability of transmitting the control information in the system for implementing the automobile electronic control function.

Figure 11:
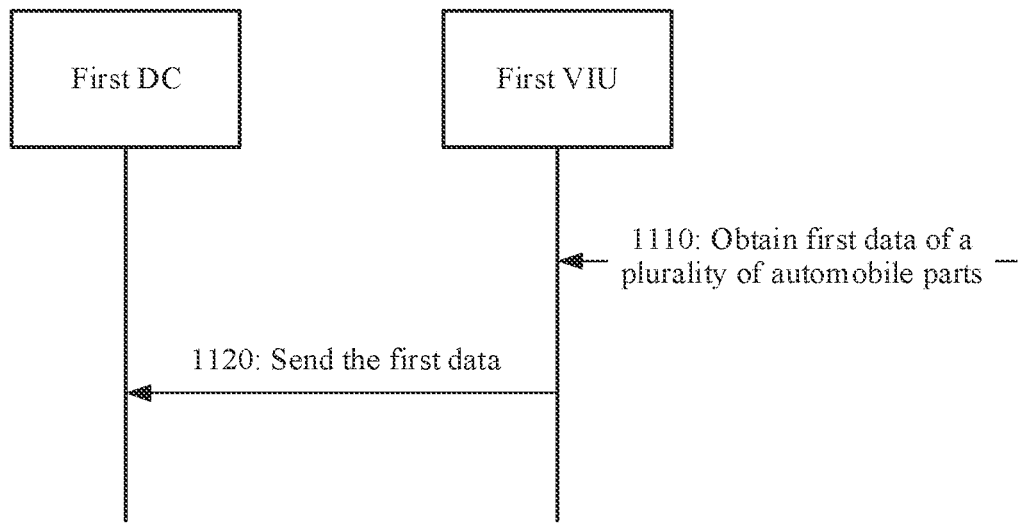
FIG. 11 is a flowchart of a data processing method according to an embodiment of this application.
Figure 12:
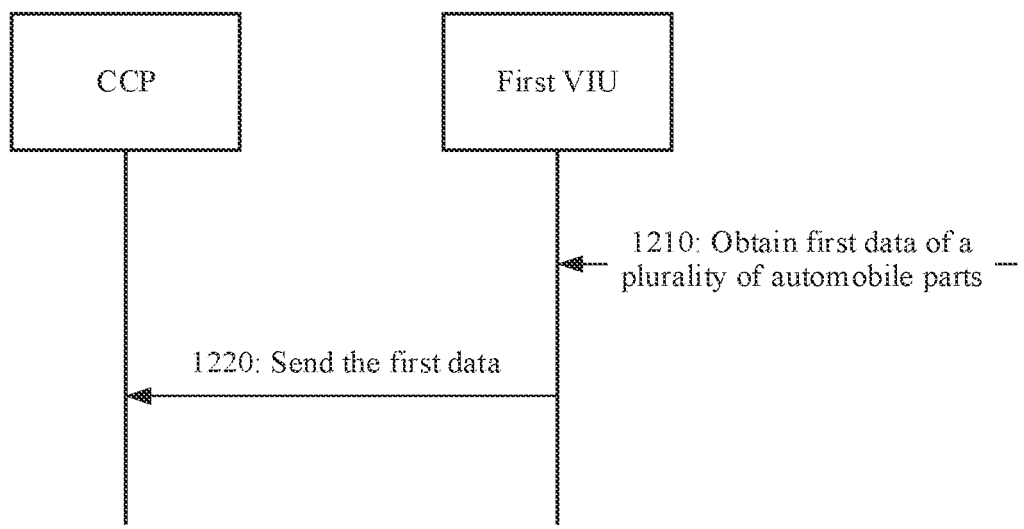
FIG. 12 is a flowchart of a data processing method according to another embodiment of this application.

Based on the system for implementing the automobile electronic control function shown in FIG. 3 and the system for implementing the automobile electronic control function shown in FIG. 4, the following describes a data transmission method in the embodiments of this application with reference to FIG. 11 and FIG. 12. It should be understood that the methods in FIG. 11 and FIG. 12 may be separately used in the architectures shown in FIG. 3 and FIG. 4, or may be used in combination with the methods shown in FIG. 9 and FIG. 10. This is not limited in the embodiments of this application.

For ease of understanding, a function of a first VIU in both the methods shown in FIG. 11 and FIG. 12 is first described. The following describes a possible function of the VIU from three aspects. It should be understood that the VIU may have one or more of the following functions.

1. An electronic control function: The VIU is configured to implement an electronic control function provided by an ECU in some or all of the automobile parts. For example, the VIU has a control function required by an automobile part. For another example, the VIU has a data processing function required by an automobile part.

2. A function that is the same as that of a gateway: The VIU may further have some or all functions that are the same as those of the gateway, for example, a protocol conversion function, a protocol encapsulation and forwarding function, and a data format conversion function.

3. A data processing function across an automobile part: The VIU processes and calculates data obtained from executors in a plurality of automobile parts.

It should be noted that the data in the function and "first data" and "second data" below may include running data of an executor in an automobile part. For example, the data includes a motion parameter of the executor and a working state of the executor. The data in the function may further be data collected using a data collection unit (for example, a sensible element) of an automobile part. For example, the data may be road information of a road on which the automobile travels that is collected using the sensible element of the automobile, weather information, or the like. This is not specifically limited in this embodiment of this application.

FIG. 11 is a flowchart of a data processing method according to an embodiment of this application. It should be understood that the method shown in FIG. 11 may be performed by any VIU in the system 300 for implementing the automobile electronic control function. The VIU is referred to as a "first VIU" below. The method shown in FIG. 11 includes a step 1110 and a step 1120.

1110: The first VIU is configured to obtain first data of a plurality of automobile parts.

The first data may be data that is not processed by the first VIU. The first data may further be obtained after the first VIU processes second data. In other words, after obtaining the second data, the first VIU processes the second data to obtain the first data. For a processing manner, refer to the description of the VIU function. For brevity, details are not described herein again.

Based on different types of automobile parts, manners of obtaining data by the first VIU are different. It should be understood that the "data" indicates data directly obtained by the first VIU from an automobile part. For example, the data is the second data, or may also indicate the first data when the first VIU does not process the data. The following describes three cases.

If the automobile part is the automobile part that does not include an ECU, or the automobile part that includes only some electronic control functions (for example, control functions), the first VIU may directly collect the first data from sensible elements of the plurality of automobile parts.

If the automobile part is the automobile part that does not include the ECU, or the automobile part that includes only some electronic control functions (for example, the control function), the first VIU may directly collect the first data from execution elements of the plurality of automobile parts.

If the automobile part is the automobile part including all the electronic control functions, the first VIU may collect the first data from the ECU that implements the electronic control function.

1120: The first VIU is configured to send the first data to a first DC.

After the first VIU sends the first data to the first DC, the first DC may process the first data in a conventional data processing manner, for example, data merging. For brevity, details are not described herein.

Optionally, when the electronic function control architecture shown in FIG. 3 includes a plurality of VIUs, the first VIU may provide a backup function for a second VIU. The backup function mainly includes replacing the second VIU to provide a data processing function for an automobile part in a second automobile part set.

In other words, the plurality of automobile parts are a first automobile part set. The automobile further includes the second automobile part set. The first VIU is configured to provide a data processing function for the first automobile part set. The second VIU is configured to provide a data processing function for the second automobile part set. The first VIU is configured to: obtain data in the second automobile part set if the second VIU fails; and send the data in the second automobile part set.

Optionally, when the electronic function control architecture 300 includes the plurality of VIUs, a third VIU in the plurality of VIUs may provide a backup function for the first VIU. The backup function mainly includes replacing the first VIU to provide data processing functions for the plurality of automobile parts. The third VIU may be a VIU that is in the electronic function control architecture 300 and that is configured to provide the backup function. In other words, the third VIU usually does not provide a data processing function for an automobile part. When a VIU (for example, the first VIU) in the electronic function control architecture 400 fails, the third VIU may replace the first VIU to provide the data processing functions for the plurality of automobile parts.

To improve flexibility of data transmission in the electronic control architecture, the first VIU may be in communication connection with a plurality of DCs. In other words, the first VIU is further configured to send the first data to a second DC. Correspondingly, the second DC may forward the first data to a CCP, or the second DC may process the first data, for example, the data fusion and calculation.

FIG. 12 is a flowchart of a data processing method according to another embodiment of this application. It should be understood that the method shown in FIG. 12 may be performed by any VIU in the system 400 for implementing the automobile electronic control function. The VIU is referred to as a "first VIU" below. The method shown in FIG. 12 includes a step 1210 and a step 1220.

1210: The first VIU is configured to obtain first data of a plurality of automobile parts.

The first data may be data that is not processed by the first VIU. The first data may further be obtained after the first VIU processes second data. In other words, after obtaining the second data, the first VIU processes the second data to obtain the first data. For a processing manner, refer to the description of the VIU function. For brevity, details are not described herein again.

Based on different types of automobile parts, manners of obtaining data by the first VIU are different. It should be understood that the "data" indicates data directly obtained by the first VIU from an automobile part. For example, the data is the second data, or may also indicate the first data when the first VIU does not process the data. The following describes three cases.

If the automobile part is the automobile part that does not include an ECU, or the automobile part that includes only some electronic control functions (for example, control functions), the first VIU may directly collect the first data from sensible elements of the plurality of automobile parts.

If the automobile part is the automobile part that does not include the ECU, or the automobile part that includes only some electronic control functions (for example, the control function), the first VIU may directly collect the first data from execution elements of the plurality of automobile parts.

If the automobile part is the automobile part including all the electronic control functions, the first VIU may collect the first data from the ECU that implements the electronic control function.

1220: The first VIU is configured to send the first data to a CCP.

After the first VIU sends the first data to the CCP, the CCP may process the first data in a conventional data processing manner, for example, data merging. For brevity, details are not described herein.

Optionally, when the electronic function control architecture shown in FIG. 4 includes a plurality of VIUs, the first VIU may provide a backup function for a second VIU. The backup function mainly includes replacing the second VIU to provide a data processing function for an automobile part in a second automobile part set.

In other words, the plurality of automobile parts are a first automobile part set. The automobile further includes the second automobile part set. The first VIU is configured to provide a data processing function for the first automobile part set. The second VIU is configured to provide a data processing function for the second automobile part set. The first VIU is configured to: obtain data in the second automobile part set if the second VIU fails; and send the data in the second automobile part set.

Optionally, when the electronic function control architecture 400 includes the plurality of VIUs, a third VIU in the plurality of VIUs may provide a backup function for the first VIU. The backup function mainly includes replacing the first VIU to provide data processing functions for the plurality of automobile parts. The third VIU may be a VIU that is in the electronic function control architecture 400 and that is configured to provide the backup function. In other words, the third VIU usually does not provide a data processing function for an automobile part. When a VIU (for example, the first VIU) in the electronic function control architecture 400 fails, the third VIU may replace the first VIU to provide the data processing functions for the plurality of automobile parts.

The foregoing describes, with reference to FIG. 1 to FIG. 12, the system and the method for implementing the electronic control function in the embodiments of this application. The following describes, with reference to FIG. 13 and FIG. 14, a VIU in the embodiments of this application. It should be understood that the block diagrams of the VIU shown in FIG. 13 and FIG. 14 are applied to any VIU in the system 300 or the system 400.

Figure 13:
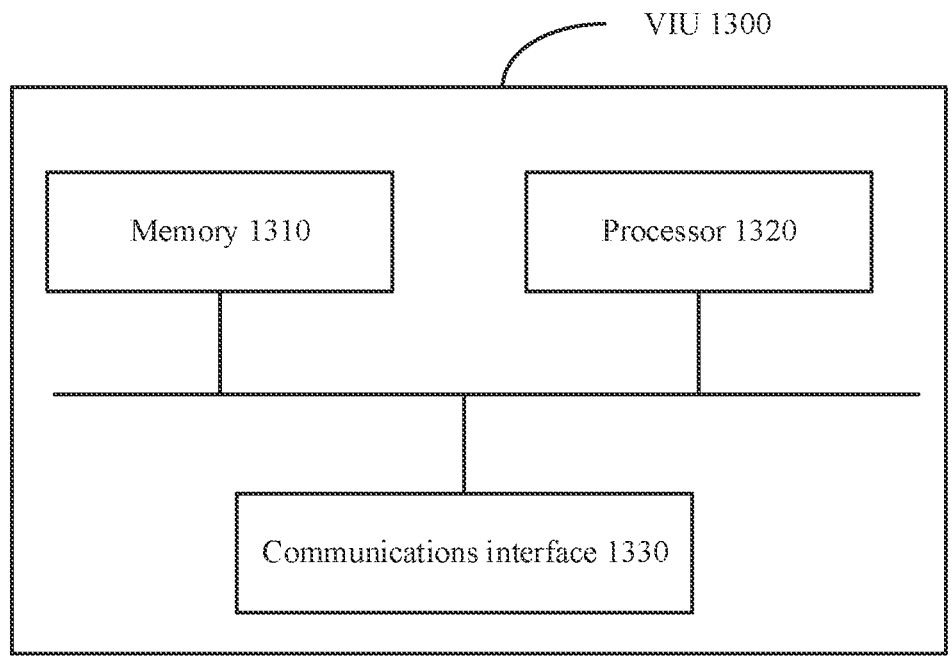
FIG. 13 is a schematic block diagram of a VIU according to an embodiment of this application.
Figure 14:
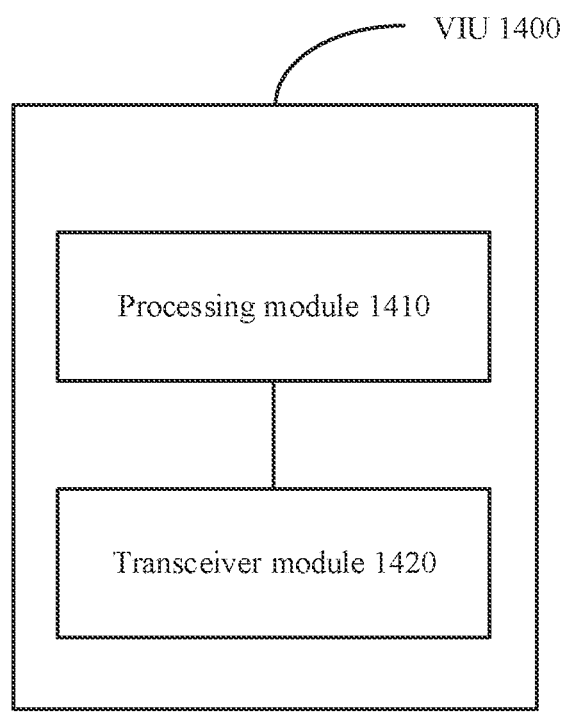
FIG. 14 is a schematic block diagram of a VIU according to an embodiment of this application.

FIG. 13 is a schematic block diagram of a VIU according to an embodiment of this application. The VIU 1300 shown in FIG. 13 may include a memory 1310, a processor 1320, and a communications interface 1330. The memory 1310, the processor 1320, and the communications interface 1330 are connected through an internal connection path. The memory 1310 is configured to store an instruction. The processor 1320 is configured to execute the instruction stored in the memory 1320, to control the communications interface 1330 to receive/send data or control information. Optionally, the memory 1310 may be coupled to the processor 1320 using an interface, or integrated with the processor 1320.

Optionally, the VIU 1300 may implement various functions implemented by the VIU in the foregoing description. For example, the communications interface 1330 may perform operations performed by the first VIU in the step 910 and the step 920. For another example, the communications interface 1330 may perform operations performed by the first VIU in the step 1010 and the step 1020. For another example, the communications interface 1330 may perform operations performed by the first VIU in the step 1110 and the step 1120. For another example, the communications interface 1330 may perform operations performed by the first VIU in the step 1210 and the step 1220.

It should be noted that the communications interface 1330 uses a transceiver apparatus such as but not limited to a transceiver to implement communication between a communications device 1300 and another device or a communications network. The communications interface 1330 may further include an input/output interface.

In an implementation process, steps in the foregoing methods may be implemented using a hardware integrated logic circuit in the processor 1320, or using instructions in a form of software. The method disclosed with reference to the embodiments of this application may be directly performed by a hardware processor, or may be performed using a combination of hardware in the processor and a software module. A software module may be located in a mature storage medium in the art, such as a random-access memory, a flash memory, a read-only memory, a programmable read-only memory, an electrically erasable programmable memory, or a register. The storage medium is located in the memory 1310, and the processor 1320 reads information in the memory 1310 and completes the steps in the foregoing methods in combination with hardware of the processor. To avoid repetition, details are not described herein.

It should be understood that, the processor 1320 in the embodiments of this application may be a central processing unit (CPU). The processor may further be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor 1320 may be any conventional processor, or the like.

It should also be understood that in the embodiments of this application, the memory 1310 may include a read-only memory and a random access memory, and provide an instruction and data to the processor 1320. A part of the processor 1320 may further include a non-volatile random-access memory. For example, the processor 1320 may further store information of a device type.

In an optional embodiment, the processor 1320 may be a processing module 1410, and the communications interface 1330 may be a transceiver module 1420. Details are shown in FIG. 14.

FIG. 14 is a schematic block diagram of a VIU according to an embodiment of this application. The VIU 1400 shown in FIG. 14 includes the processing module 1410 and the transceiver module 1420.

Optionally, the VIU 1400 may transmit the foregoing data or control information using the transceiver module 1420, and implement the data processing function, the control function, or the like described above using the processing module 1410. For example, the transceiver module 1420 may be used to perform operations performed by the first VIU in the step 910 and the step 920. For another example, the transceiver module 1420 may be used to perform operations performed by the first VIU in the step 1010 and the step 1020. For another example, the transceiver module 1420 may be used to perform operations performed by the first VIU in the step 1110 and the step 1120. For another example, the transceiver module 1420 may be used to perform operations performed by the first VIU in the step 1210 and the step 1220.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A system for implementing an automobile electronic control function of an automobile, wherein the system comprises:
   an automobile control unit configured to provide an electronic control function for a first automobile part in a first functional domain, wherein the automobile control unit comprises a first domain controller (DC) of the first functional domain or a central computing platform; and
   a plurality of vehicle integration units (VIUs) comprising a first VIU, wherein the plurality of VIUs form a ring communications network, or the plurality of VIUs are in communication connection with the automobile control unit, wherein the first VIU connects with the automobile control unit and the first automobile part in the first functional domain, wherein the electronic control function comprises a control function and a data processing function,
   wherein for the control function, the automobile control unit is configured to send first control information to the first VIU, and the first VIU is configured to receive the first control information and control the first automobile part to perform a first operation based on the first control information,
   wherein for the data processing function, the automobile control unit is configured to process data of the first automobile part, and the first VIU is configured to serve as a gateway to send processed data to the first automobile part or receive the data of the first automobile part and send the data of the first automobile part to the automobile control unit for processing,
   wherein the automobile control unit comprises a second DC of a second functional domain, and the system comprises the first automobile part and further comprises a second automobile part that is in the second functional domain for performing a second operation, wherein the second operation is different from the first operation,
   wherein the plurality of VIUs comprises a second VIU, wherein the second VIU connects the second DC with the second automobile part,
   wherein the second DC is configured to send second control information to the second VIU, wherein the second VIU is configured to receive the second control information and control the second automobile part to perform the second operation based on the second control information, and
   wherein the first VIU is further configured to:
      receive, when the second VIU fails, the second control information for controlling the second automobile part; and
      control the second automobile part based on the second control information.

2. The system of claim 1, wherein the DC is further configured to:
   provide the electronic control function for the second automobile part; and
   process second data of the second automobile part or send the second control information for controlling the second automobile part, and
   wherein the system further comprises a corresponding VIU coupled to the second automobile part and configured to:
      receive the second control information and control the second automobile part based on the second control information for the control function; and
      serve as the gateway to send second processed data to the second automobile part, or receive the second data and send the second data to the second DC for the data processing function.

3. The system of claim 2, wherein the corresponding VIU is the first VIU or the second VIU.

4. The system of claim 2, wherein the corresponding VIU is the second VIU, and wherein when the second VIU fails, the first VIU is configured to:
   receive the second control information and control the second automobile part based on the second control information; or
   serve as the gateway to send the second processed data to the second automobile part, or receive the second data and send the second data to the second DC.

5. The system of claim 2, wherein the first DC or the second DC is a self-driving domain controller, a cockpit domain controller (CDC), or a vehicle domain controller (VDC).

6. The system of claim 2, wherein the first DC is an intelligent driving domain controller of an automobile, and wherein the second DC comprises a chassis domain controller of the automobile.

7. The system of claim 1, wherein the automobile control unit is further configured to implement some or all electronic control functions of automobile parts in the first functional domain.

8. The system of claim 1, wherein any two VIUs in the plurality of VIUs have a communication connection with one another.

9. The system of claim 1, wherein the automobile control unit is the central computing platform (CCP).

10. The system of claim 9, wherein the CCP is configured to:
    provide the electronic control function for the second automobile part; and
    send the second control information or process second data of the second automobile part,
    wherein the system further comprises a corresponding VIU coupled to the second automobile part and configured to:
       receive the second control information and control the second automobile part based on the second control information for the control function; and
       serve as the gateway to send second processed data to the second automobile part, or receive the second data and send the second data to the second DC for the data processing function.

11. The system of claim 10, wherein the corresponding VIU is the first VIU or the second VIU.

12. The system of claim 11, wherein the corresponding VIU is the second VIU, and wherein when the second VIU fails, the first VIU is configured to:
    receive the second control information and control the second automobile part based on the second control information; or
    serve as the gateway to send the second processed data to the second automobile part, or receive the second data and send the second data to the second DC for processing.

13. A method for implementing an electronic control function of an automobile, wherein the automobile comprises a plurality of vehicle integration units (VIUs), wherein the method comprises:

receiving, by a first vehicle integration unit (VIU) of the plurality of VIUs, first control information from an automobile control unit of the automobile, wherein the first VIU serves as a controller and a gateway for a first automobile part in a first functional domain, wherein the automobile control unit is configured to provide the electronic control function for the first automobile part in the first functional domain, wherein the automobile control unit comprises a first domain controller (DC) of the first function domain or a central computing platform, and wherein the plurality of VIUs form a ring communications network, or the plurality of VIUs are in communication connection with the automobile control unit;

controlling, by the first VIU, the first automobile part to perform a first operation based on the first control information;

receiving, by the first VIU when a second VIU fails, second control information from a second DC of a second functional domain to control a second automobile part in the second functional domain; and controlling, by the first VIU, the second automobile part based on the second control information.

14. The method of claim 13, further comprising:
receiving, by the first VIU, processed data from the automobile control unit; and
sending, by the first VIU, the processed data to the first automobile part.

15. The method of claim 13, further comprising:
receiving, by the first VIU, data from the first automobile part; and
sending, by the first VIU, the data to the automobile control unit for processing.

16. The method of claim 13, wherein the automobile control unit is further configured to implement some or all electronic control functions of automobile parts in the first functional domain.

17. A vehicle integration unit (VIU) in an automobile comprising:

a memory configured to store instructions; and
a processor coupled to the memory and configured to execute the instructions to cause the VIU to:
receive first control information from an automobile control unit of the automobile, wherein the automobile control unit is configured to provide an electronic control function for a first automobile part in a first functional domain, wherein the electronic control function comprises a control function and a data processing function, wherein the automobile control unit comprises a first domain controller (DC) of the first functional domain or a central computing platform;
connect with a plurality of VIUs to form a ring communications network, or the VIUs are in communication connection with the automobile control unit;
control the first automobile part to perform a first operation based on the first control information;
receive, when a second VIU fails, second control information from a second DC to control a second automobile part in a second functional domain; and
control the second automobile part based on the second control information.

18. The VIU of claim 17, wherein the processor is further configured to execute the instructions to cause the VIU to:
receive processed data from the automobile control unit; and
send the processed data to the first automobile part.

19. The VIU of claim 17, wherein the processor is further configured to execute the instructions to cause the VIU to:
receive data from the first automobile part; and
send the data to the automobile control unit for processing.

20. The VIU of claim 17, wherein the automobile control unit is further configured to implement some or all electronic control functions of automobile parts in the first functional domain.

* * * * *